United States Patent
Iwamura et al.

(10) Patent No.: US 9,481,984 B2
(45) Date of Patent: Nov. 1, 2016

(54) CALIBRATION DEVICE FOR WORK MACHINE AND CALIBRATION METHOD OF WORKING EQUIPMENT PARAMETER FOR WORK MACHINE

(71) Applicant: KOMATSU LTD., Minato-ku, Tokyo (JP)

(72) Inventors: Tsutomu Iwamura, Yokohama (JP); Jin Kitajima, Ohiso-machi (JP); Masanobu Seki, Fujisawa (JP); Masashi Ichihara, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 14/781,649

(22) PCT Filed: Mar. 27, 2015

(86) PCT No.: PCT/JP2015/059789
§ 371 (c)(1),
(2) Date: Oct. 1, 2015

(87) PCT Pub. No.: WO2015/137526
PCT Pub. Date: Sep. 17, 2015

(65) Prior Publication Data
US 2016/0281334 A1    Sep. 29, 2016

(51) Int. Cl.
*E02F 9/26* (2006.01)
*E02F 3/32* (2006.01)
(Continued)

(52) U.S. Cl.
CPC .............. *E02F 9/264* (2013.01); *E02F 3/32* (2013.01); *E02F 3/425* (2013.01); *G01D 5/14* (2013.01); *G01D 5/34* (2013.01)

(58) Field of Classification Search
CPC ........... E02F 9/264; E02F 3/425; E02F 5/34; E02F 3/32; G01D 5/14

USPC ................................................... 701/50, 34.4
See application file for complete search history.

(56) References Cited

U.S. PATENT DOCUMENTS 6,321,137 B1    11/2001    De Smet
8,145,394 B2 *    3/2012    Chiorean ................ E02F 3/435
                                                                       701/33.1
(Continued)

FOREIGN PATENT DOCUMENTS

CN    103080426    5/2013
CN    103097614    5/2013
(Continued)

OTHER PUBLICATIONS

International Search Report dated Jun. 16, 2015 for corresponding International Application No. PCT/JP2015/059789, 10 pages.
(Continued)

*Primary Examiner* — Thomas Tarcza
*Assistant Examiner* — Tyler J Lee
(74) *Attorney, Agent, or Firm* — Fish & Richardson P.C.

(57) ABSTRACT

A calibration device for a work machine includes: a working equipment parameter acquiring unit acquiring working equipment parameters of members of first and second actuation units; a measurement value acquiring unit acquiring respective measurement values of the work machine body and first and second actuation units measured by an external measurement device; a first calibration unit calibrating the parameter related to the member of the first actuation unit acquired by the acquiring unit based on the measurement value of the first actuation unit acquired by the acquiring unit; and a second calibration unit calibrating the working equipment parameter of the member of the second actuation unit based on the working equipment parameter of the first actuation unit calibrated by the first calibration unit and the respective measurement values of the reference points of the work machine body and first and second actuation units acquired by the acquiring unit.

8 Claims, 18 Drawing Sheets

(51) Int. Cl.
*E02F 3/42* (2006.01)
*G01D 5/14* (2006.01)
*G01D 5/34* (2006.01)

(56) References Cited

U.S. PATENT DOCUMENTS

| | | | |
|---|---|---|---|
| 8,838,329 B2* | 9/2014 | Seki | E02F 9/264 701/33.1 |
| 9,020,693 B2* | 4/2015 | Seki | E02F 9/264 701/34.4 |
| 9,157,216 B2* | 10/2015 | Seki | E02F 9/264 |
| 2004/0124605 A1* | 7/2004 | McClure | A01B 69/004 280/456.1 |
| 2009/0228169 A1* | 9/2009 | Chiorean | E02F 3/435 701/29.1 |
| 2010/0023229 A1* | 1/2010 | Chiocco | A01B 69/003 701/50 |
| 2013/0158788 A1 | 6/2013 | Seki | |
| 2013/0158789 A1* | 6/2013 | Seki | E02F 9/264 701/34.4 |
| 2013/0166143 A1 | 6/2013 | Seki | |

FOREIGN PATENT DOCUMENTS

| | | |
|---|---|---|
| JP | 2001055762 A | 2/2001 |
| JP | 2001515236 A | 9/2001 |
| JP | 2012202061 A | 10/2012 |
| JP | 2012202062 A | 10/2012 |
| JP | 2012233353 A | 11/2012 |

OTHER PUBLICATIONS

Office Action in corresponding Chinese Application No. 201580000442.9, issued Aug. 2, 2016, 7 pp., with English translation.

* cited by examiner

CALIBRATION DEVICE FOR WORK MACHINE AND CALIBRATION METHOD OF WORKING EQUIPMENT PARAMETER FOR WORK MACHINE

CROSS-REFERENCE TO RELATED APPLICATIONS

This application claims priority to International Application No. PCT/JP2015/059789 filed on Mar. 27, 2015, the content of which application is incorporated herein by reference in its entirety.

TECHNICAL FIELD

The present invention relates to a calibration device for a work machine and a calibration method of a working equipment parameter for a work machine.

BACKGROUND ART

A hydraulic excavator including a position detecting unit configured to detect the current position of a work point of working equipment has been known. For instance, in a hydraulic excavator disclosed in Patent Literature 1, the position coordinates of a blade edge of a bucket is calculated based on position information from a GPS antenna. Specifically, the position coordinates of the blade edge of the bucket are calculated based on parameters such as a positional relationship between the GPS antenna and a boom pin, the respective lengths of the boom, arm and bucket, and the respective direction angles of the boom, arm and bucket. The position coordinate of each of the arm and bucket is calculated based on a sensor output value acquired from, for instance, a stroke sensor, which is attached to a cylinder for swinging each of the arm and bucket to acquire an extension/retraction state of the cylinder.

With such a technique, the position of the blade edge of the bucket can be estimated by a controller of the hydraulic excavator to move the blade edge of the bucket in conformity with a designed excavated surface, thereby preventing the excavated surface from being excessively excavated with the bucket and efficiently performing the excavation work.

For the above technique, it is important that the controller of the hydraulic excavator should accurately detect the position of the blade edge of the bucket. Accordingly, in the technique disclosed in Patent Literature 1, for instance, five of the attitudes of the blade edge of the bucket of the working equipment are measured by an external measurement device such as a total station, and the controller of the hydraulic excavator calibrates working equipment parameters necessary for calculation of the position of the blade edge based on the resulting measurement value of the blade edge of the bucket.

CITATION LIST

Patent Literature(s)

Patent Literature 1: JP-A-2012-202061

SUMMARY OF THE INVENTION

Problem(s) to be Solved by the Invention

In the technique disclosed in Patent Literature 1, all the working equipment parameters of the boom, arm and bucket are calibrated based on the position of the blade edge of the bucket, which results in an inevitable error between the calibrated working equipment parameters and corresponding true values. Further, when the blade edge is in an attitude other than the attitudes for calibration, an estimation accuracy of the position of the blade edge of the bucket is poor as compared with an actual measurement value of the position of the blade edge of the bucket. It is thus difficult to reduce the error to fall within a predetermined acceptable range.

An object of the invention is to provide a calibration device for a work machine and a calibration method of a working equipment parameter for the work machine, the work machine including: a work machine body; and working equipment including a first actuation unit swingably connected to the work machine body and a second actuation unit swingably connected to the first actuation unit, the calibration device and calibration method being capable of highly accurate estimation of a position of a reference point of the second actuation unit.

Means for Solving the Problem(s)

According to a first aspect of the invention, a calibration device for a work machine, the work machine including: a work machine body; working equipment swingably connected to the work machine body, the working equipment including: a first actuation unit swingably connected to the work machine body, the first actuation unit being configured to be actuated by a first hydraulic cylinder provided to the work machine body; and a second actuation unit swingably connected to the first actuation unit, the second actuation unit being configured to be actuated by a second hydraulic cylinder provided to the first actuation unit; first swing angle detector configured to detect swing angle information of the first actuation unit relative to the work machine body; a second swing angle detector configured to detect swing angle information of the second actuation unit relative to the first actuation unit; an attitude calculating unit configured to calculate respective attitudes of the first actuation unit and the second actuation unit based on the detected swing angle information of the first actuation unit and the second actuation unit; and an estimated position calculating unit configured to calculate an estimated position of a reference point of the first actuation unit based on a working equipment parameter related to a member of the first actuation unit and the attitude of the first actuation unit calculated by the attitude calculating unit and calculate an estimated position of a reference point of the second actuation unit based on a working equipment parameter related to a member of the second actuation unit and the attitude of the second actuation unit calculated by the attitude calculating unit, the calibration device being provided to the work machine to calibrate the working equipment parameters, the calibration device includes: a measurement value acquiring unit configured to acquire a measurement value of a reference point of the work machine body, a measurement value of the reference point of the first actuation unit and a measurement value of the reference point of the second actuation unit, the measurement values being measured using an external measurement device; a working equipment parameter acquiring unit configured to acquire the working equipment parameter related to the member of the first actuation unit and the working equipment parameter related to the member of the second actuation unit, the working equipment parameters being used by the estimated position calculating unit; a first calibration unit configured to calibrate the working equipment parameter related to the member of the first actuation unit based on the respective measurement values of the reference points of the work machine body and the first actuation unit measured by the measurement value acquiring unit; and a second calibration unit configured to calibrate the working equipment parameter related to the member of the second actuation unit based on the working equipment parameter related to the member of the first actuation unit calibrated by the first calibration unit and the respective measurement values of the reference points of the work machine body, the first actuation unit and the second actuation unit acquired by the measurement value acquiring unit.

In the first aspect of the invention, the first calibration unit calibrates a working equipment parameter of the member of the first actuation unit in advance, so that second calibration unit can calibrate a working equipment parameter of the member of the second actuation unit based on the calibrated working equipment parameter and a measurement value of a reference point of the second actuation unit. Therefore, since an error in the working equipment parameter of the member of the first actuation unit is reduced, the working equipment parameter of the member of the second auction unit can be highly accurately calibrated.

According to a second aspect of the invention, in the first aspect, the first swing angle detector and the second swing angle detector are respectively provided to the first hydraulic cylinder and the second hydraulic cylinder, and each include a stroke displacement detector that detects a stroke displacement of the first hydraulic cylinder or the second hydraulic cylinder.

According to a third aspect of the invention, in the second aspect, the work machine further includes an encoder configured to detect a swing angle of the first actuation unit relative to the work machine body, and the attitude calculating unit calibrates a reference position of the stroke displacement detector based on a reference position of the swing angle of the first actuation unit detected by the encoder.

According to a fourth aspect of the invention, in any one of the first to third aspects, the first calibration unit calibrates the working equipment parameter related to the member of the first actuation unit by repeating convergence calculation until a numerical analytic formula including the working equipment parameter related to the member of the first actuation unit and the measurement value of the reference point of the first actuation unit is converged within a predetermined acceptable error range, the second calibration unit calibrates the working equipment parameter related to the member of the second actuation unit by repeating convergence calculation until a numerical analytic formula including the working equipment parameter related to the member of the second actuation unit and the measurement value of the reference point of the second actuation unit is converged within a predetermined acceptable error range, and the acceptable error range for the second calibration unit is larger than the acceptable error range for the first calibration unit.

According to a fifth aspect of the invention, in any one of the first to fourth aspects, the first actuation unit includes: a boom swingably connected to the work machine body with a pin to be actuated by a boom cylinder provided to the work machine body; and an arm swingably connected to a distal end of the boom with a pin to be actuated by an arm cylinder provided to the boom, the second actuation unit includes a bucket connected to a distal end of the arm with a pin, the reference point of the first actuation unit is defined by the pin at the distal end of the arm, and the reference point of the second actuation unit is defined by a distal end of the bucket in a work direction.

According to a sixth aspect of the invention, in the fifth aspect, the first calibration unit calibrates the working equipment parameter related to the member of the first actuation unit based on three attitudes of the work machine, and the second calibration unit calibrates the working equipment parameter related to the member of the second actuation unit based on two attitudes of the work machine.

According to a seventh aspect of the invention, a calibration device for a work machine, the work machine including: a work machine body; working equipment swingably connected to the work machine body, the working equipment including: a boom swingably connected to the work machine body, the boom being configured to be actuated by a boom cylinder provided to the work machine body; an arm swingably connected to the boom, the arm being configured to be actuated by an arm cylinder provided to the boom; and a bucket swingably connected to the arm, the bucket being configured to be actuated by a bucket cylinder provided to the arm, a boom swing angle detector configured to detect swing angle information of the boom relative to the work machine body; an arm swing angle detector configured to detect swing angle information of the arm relative to the boom; a bucket swing angle detector configured to detect swing angle information of the bucket relative to the arm; an attitude calculating unit configured to calculate attitudes of the boom, the arm and the bucket respectively based on the detected swing angle information detected by the boom swing angle detector, the arm swing angle detector and the bucket swing angle detector; and an estimated position calculating unit configured to calculate an estimated position of a blade edge of the bucket based on a working equipment parameter related to the boom, a working equipment parameter related to the arm, a working equipment parameter related to the bucket and the respective attitudes of the boom, the arm and the bucket calculated by the attitude calculating unit, the calibration device being provided to the work machine to calibrate the working equipment parameters, the calibration device includes: a measurement value acquiring unit configured to acquire a measurement value of a reference point of the work machine body, a measurement value of a reference point of the boom, a measurement value of a reference point of the arm and a measurement value of a reference point of the bucket, the measurement values being measured by an external measurement device; a working equipment parameter acquiring unit configured to acquire the working equipment parameters related to the boom, the arm and the bucket, the working equipment parameters being used by the estimated position calculating unit; a first calibration unit configured to calibrate the working equipment parameters related to the boom and the arm based on the respective measurement values of the reference points of the work machine body, the boom and the arm acquired by the measurement value acquiring unit; and a second calibration unit configured to calibrate the working equipment parameter related to the bucket based on the working equipment parameters related to the boom and the arm calibrated by the first calibration unit and the respective measurement values of the reference points of the work machine body, the boom, the arm and the bucket acquired by the measurement value acquiring unit.

According to an eighth aspect of the invention, a calibration method for a work machine, the work machine including: a work machine body; working equipment swingably connected to the work machine body, the working equipment including: a first actuation unit swingably connected to the work machine body, the first actuation unit being configured to be actuated by a first hydraulic cylinder provided to the work machine body; and a second actuation unit swingably connected to the first actuation unit, the second actuation unit being configured to be actuated by a second hydraulic cylinder provided to the first actuation unit; a first swing angle detector configured to detect swing angle information of the first actuation unit relative to the work machine body; a second swing angle detector configured to detect swing angle information of the second actuation unit relative to the first actuation unit; an attitude calculating unit configured to calculate respective attitudes of the first actuation unit and the second actuation unit based on the detected swing angle information of the first actuation unit and the second actuation unit; and an estimated position calculating unit configured to calculate an estimated position of a reference point of the first actuation unit based on a working equipment parameter related to a member of the first actuation unit and the attitude of the first actuation unit calculated by the attitude calculating unit and calculate an estimated position of a reference point of the second actuation unit based on a working equipment parameter related to a member of the second actuation unit and the attitude of the second actuation unit calculated by the attitude calculating unit, the calibration method being performed in the work machine to calibrate the working equipment parameters, the calibration method includes: acquiring the working equipment parameter related to the member related to the first actuation unit and the working equipment parameter related to the member related to the second actuation unit; acquiring a measurement value of a reference point of the work machine body, a measurement value of the reference point of the first actuation unit and a measurement value of the reference point of the second actuation unit, the measurement values being measured by an external measurement device; calibrating the working equipment parameter related to the member of the first actuation unit based on the measurement value of the reference point of the work machine body and the measurement value of the reference point of the first actuation unit; and calibrating the working equipment parameter related to the member of the second actuation unit based on the calibrated working equipment parameter related to the member of the first actuation unit and the respective measurement values of the reference points of the work machine body, the first actuation unit and the second actuation unit.

BRIEF DESCRIPTION OF DRAWING(S)

DESCRIPTION OF EMBODIMENT(S)

Description will be made below on a calibration device and a calibration method for a hydraulic excavator according to an exemplary embodiment of the invention with reference to the attached drawings.

1. Overall Arrangement of Hydraulic Excavator 1

Figure 1:
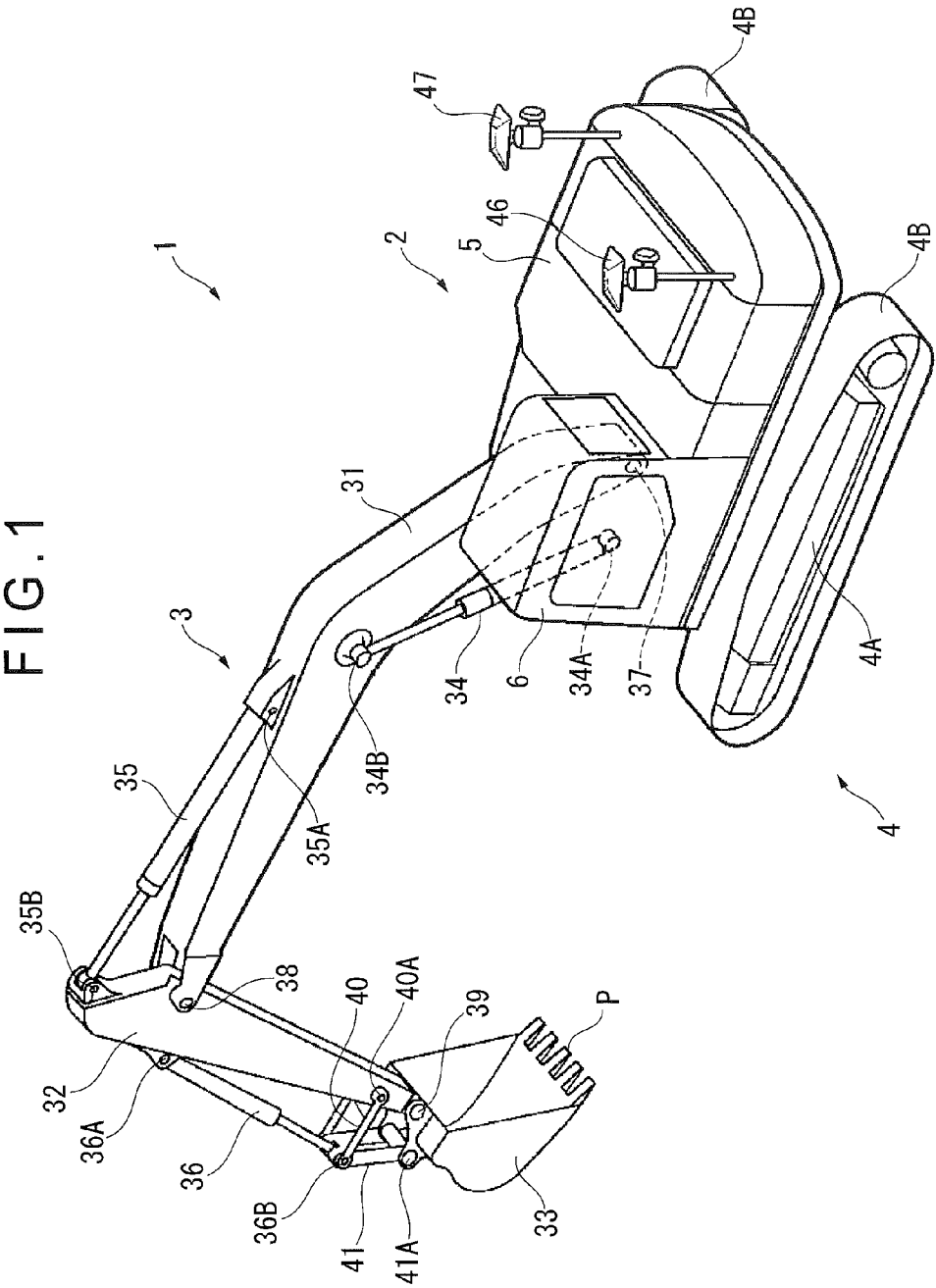
FIG. 1 is a perspective view showing a work machine according to an exemplary embodiment of the invention.

FIG. 1 is a perspective view showing a hydraulic excavator 1, in which the calibration device according to the exemplary embodiment performs calibration. The hydraulic excavator 1 includes a work machine body 2 and working equipment 3.

The work machine body 2 includes an undercarriage 4 and an upper structure 5 rotatably mounted on the undercarriage 4.

In the upper structure 5, components such as a hydraulic pump 54 and an engine 54A (both described later) are housed.

A front portion of the upper structure 5 is provided with a cab 6, in which a display input device 71 and an operation device 51 (both described later) are provided in addition to a seat for an operator to be seated.

The undercarriage 4 includes a pair of travel devices 4A, each of which includes a crawler belt 4B. The rotation of the crawler belt 4B causes the hydraulic excavator 1 to travel. It should be noted that directions of front, rear, right and left are defined with reference to the line of sight of an operator seated on the seat according to the exemplary embodiment.

The working equipment 3, which is provided to a front portion of the work machine body 2, includes a boom 31, an arm 32, a bucket 33, a boom cylinder 34, an arm cylinder 35 and a bucket cylinder 36. It should be noted that a portion including the boom 31 and the arm 32 defines a first actuation unit according to the invention, and a portion including the bucket 33, a first link member 40 (described later) and a second link member 41 (described later) defines a second actuation unit.

The boom 31 has a base end rotatably attached to the front portion of the work machine body 2 with a boom pin 37. The boom pin 37 is a rotation center of the boom 31 relative to the upper structure 5.

The arm 32 has a base end rotatably attached to a distal end of the boom 31 with an arm pin 38. The arm pin 38 is a rotation center of the arm 32 relative to the boom 31.

The bucket 33 is swingably attached to a distal end of the arm 32 with a bucket pin 39. The bucket pin 39 provided to the distal end of the arm 32 defines a reference point of the first actuation unit according to the invention and also a rotation center of the bucket 33 relative to the arm 32. The reference point of the first actuation unit may alternatively be any position in the boom 31 or the arm 32.

The boom cylinder 34, the arm cylinder 35 and the bucket cylinder 36 are hydraulic cylinders hydraulically actuated to extend and retract. It should be noted that the boom cylinder 34 or the arm cylinder 35 defines a first hydraulic cylinder according to the invention, and the bucket cylinder 36 defines a second hydraulic cylinder according to the invention.

The boom cylinder 34 has a base end rotatably attached to the upper structure 5 with a boom cylinder foot pin 34A.

The boom cylinder 34 has a distal end rotatably attached to the boom 31 with a boom cylinder top pin 34B. The boom cylinder 34 is hydraulically extended/retracted to move the boom 31.

The arm cylinder 35 has a base end rotatably attached to the boom 31 with an arm cylinder foot pin 35A.

The arm cylinder 35 has a distal end rotatably attached to the arm 32 with an arm cylinder top pin 35B. The arm cylinder 35 is hydraulically extended/retracted to move the arm 32.

The bucket cylinder 36 has a base end rotatably attached to the arm 32 with a bucket cylinder foot pin 36A.

The bucket cylinder 36 has a distal end rotatably attached to a first end of the first link member 40 and a first end of the second link member 41 with a bucket cylinder top pin 36B.

A second end of the first link member 40 is rotatably attached to the distal end of the arm 32 with a first link pin 40A.

A second end of the second link member 41 is rotatably attached to the bucket 33 with a second link pin 41A. The bucket cylinder 36 is hydraulically extended/retracted to move the bucket 33.

Figure 2A:
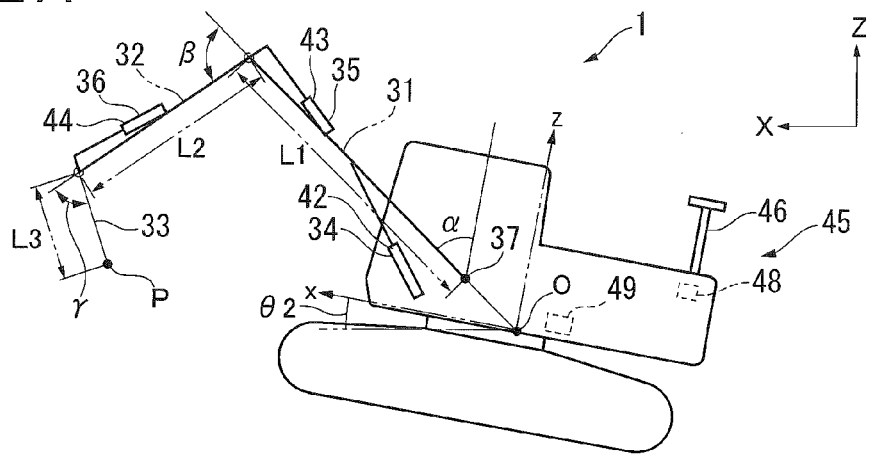
FIG. 2A is a schematic side view showing the work machine according to the exemplary embodiment.
Figure 2B:
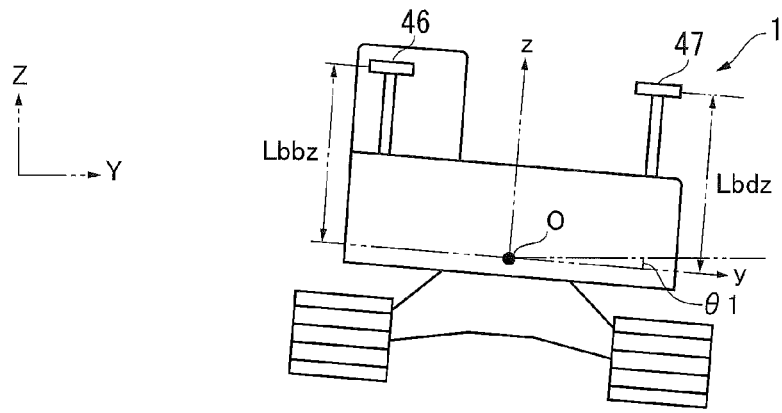
FIG. 2B is a schematic rear view showing the work machine according to the exemplary embodiment.
Figure 2C:
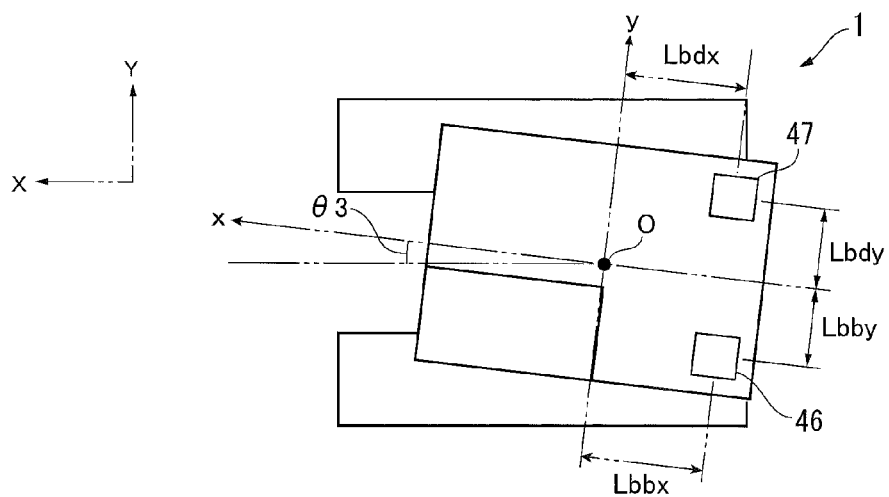
FIG. 2C is a schematic plan view showing the work machine according to the exemplary embodiment.

FIGS. 2A to 2C schematically show an arrangement of the hydraulic excavator 1. FIG. 2A is a side view showing the hydraulic excavator 1. FIG. 2B is a rear view showing the hydraulic excavator 1. FIG. 2C is a plan view showing the hydraulic excavator 1. As shown in FIG. 2A, L1 denotes a length of the boom 31 defined between the boom pin 37 and the arm pin 38. L2 denotes a length of the arm 32 defined between the arm pin 38 and the bucket pin 39. L3 denotes a length of the bucket 33 defined between the bucket pin 39 and a blade edge P of the bucket 33. It should be noted that the blade edge P of the bucket 33 defines a reference point of the second actuation unit according to the invention. The reference point of the second actuation unit may alternatively be any position in the bucket 33.

The boom cylinder 34, the arm cylinder 35 and the bucket cylinder 36 are respectively provided with a boom cylinder stroke sensor 42, an arm cylinder stroke sensor 43 and a bucket cylinder stroke sensor 44 (swing angle detectors).

The cylinder stroke sensors 42 to 44 are respectively provided at lateral sides of the hydraulic cylinders 34 to 36 to detect cylinder strokes. Based on the detected respective stroke lengths of the hydraulic cylinders 34 to 36 (i.e., swing angle information), an attitude calculating unit 72C of a display controller 72 is configured to calculate a swing angle of the boom 31 relative to the work machine body 2, a swing angle of the arm 32 relative to the boom 31, and a swing angle of the bucket 33 relative to the arm 32. It should be noted that the swing angle information may alternatively be detected by angle sensors individually attached to swingable portions of the working equipment in place of the swing angle detectors.

Specifically, based on the stroke length of the boom cylinder 34 detected by the boom cylinder stroke sensor 42, the attitude calculating unit 72C of the display controller 72 (described later) calculates a swing angle $\alpha$ of the boom 31 relative to a z-axis of a vehicle body coordinate system (described later) as shown in FIG. 2A.

Based on the stroke length of the arm cylinder 35 detected by the arm cylinder stroke sensor 43, the attitude calculating unit 72C of the display controller 72 calculates a swing angle $\beta$ of the arm 32 relative to the boom 31.

Based on the stroke length of the bucket cylinder 36 detected by the bucket cylinder stroke sensor 44, the attitude calculating unit 72C of the display controller 72 calculates a swing angle $\gamma$ of the bucket 33 relative to the arm 32. A method for calculating the swing angles $\alpha$, $\beta$, $\gamma$ will be described later.

A first encoder 42A is provided at a position of the boom pin 37, and a second encoder 43A is provided at a position of the arm pin 38.

The first encoder 42A, which defines a reference position at a predetermined angle position within a swingable range of the boom 31, outputs a pulse signal to the attitude calculating unit 72C of the display controller 72.

The second encoder 43A, which defines a reference position at a predetermined angle position within a swingable range of the arm 32, outputs a pulse signal to the attitude calculating unit 72C of the display controller 72.

The attitude calculating unit 72C calibrates a reference position of the boom cylinder stroke sensor 42 based on the pulse signal outputted from the first encoder 42A, and calibrates the arm cylinder stroke sensor 43 based on the pulse signal outputted from the second encoder 43A.

The first encoder 42A and the second encoder 43A respectively define reset sensors for the boom cylinder stroke sensor 42 and the arm cylinder stroke sensor 43.

With the above arrangement, stroke positions obtained from detection results of the cylinder stroke sensors 42, 43 can each be reset to the reference position to reduce an error, which results in highly accurate estimation of the position of the bucket pin 39 at the distal end of the arm 32.

Figure 4:
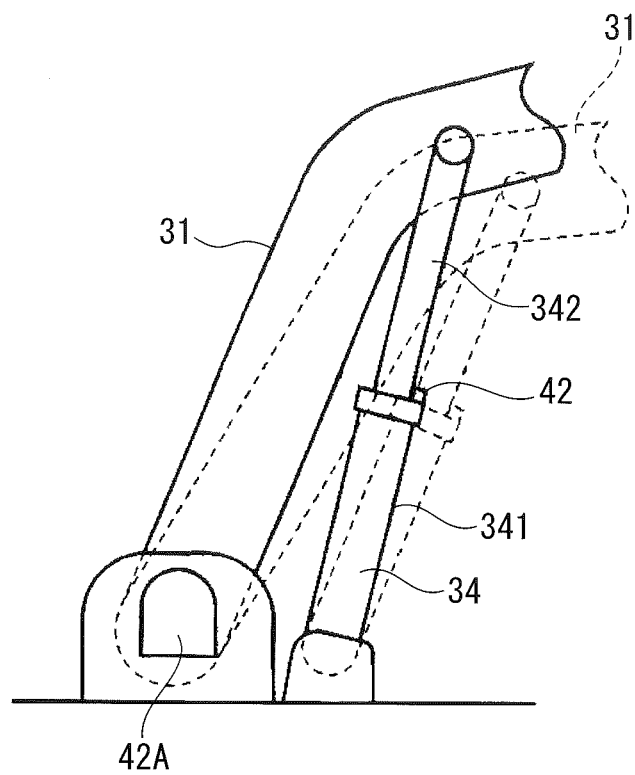
FIG. 4 is a side view showing an attached position of a first encoder according to the exemplary embodiment.
Figure 5:
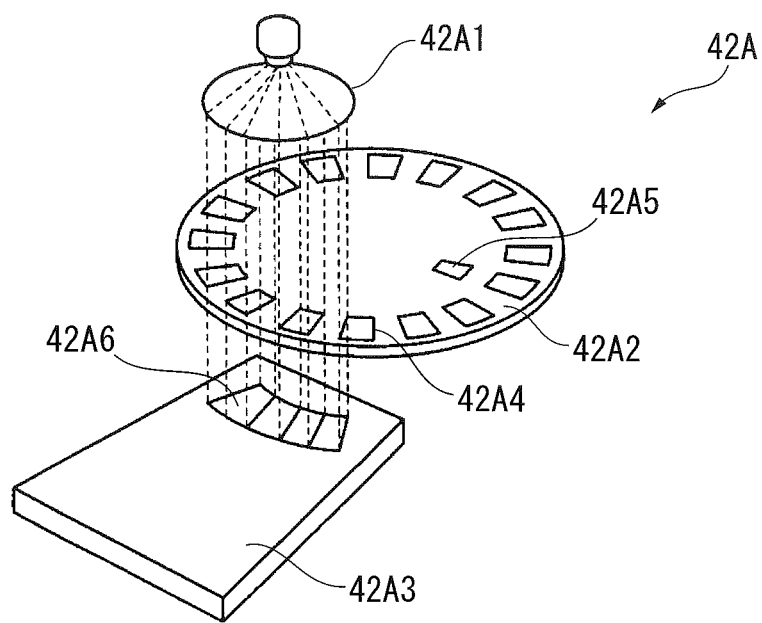
FIG. 5 is a perspective view showing an arrangement of the first encoder according to the exemplary embodiment.

Specifically, as shown in FIG. 4, the boom cylinder stroke sensor 42 is provided at a distal end of a cylinder tube 341 of the boom cylinder 34 to detect a stroke displacement of a piston 342. The first encoder 42A is provided at a swingable position of the boom 31 to calibrate the boom cylinder stroke sensor 42. As shown in FIG. 5, the first encoder 42A includes a light emitter 42A1, a disk 42A2 and a light receiver 42A3.

The light emitter 42A1 includes a light-emitting element that emits a beam to the light receiver 42A3.

The disk 42A2, which is rotatably held, includes: a plurality of slits 42A4 circumferentially arranged at a predetermined pitch; and a single slit 42A5 provided near the center of the disk 42A2 relative to the slits 42A4. The slit 42A5 is provided at a position corresponding to the reference position within the swingable range of the boom 31 (e.g., substantially the middle of the swingable range of the boom 31.

The light receiver 42A3 includes a plurality of light-receiving elements 42A6 provided at a position corresponding to the light emitter 42A1, and outputs the pulse signal when the light-receiving elements 42A6 receive light.

The disk 42A2 of the first encoder 42A rotates in accordance with the swinging movement of the boom 31. When the slit 42A5 passes under the light emitter 42A1 during the rotation of the disk 42A2, light emitted from the light emitter 42A1 is received by the light-receiving element(s) 42A6 of the light receiver 42A3 through the slit 42A5. Upon reception of the light, the light-receiving element(s) 42A6 outputs the pulse signal to the attitude calculating unit 72C. It should be noted that the second encoder 43A provided to the arm pin 38 has the same arrangement and effects as described above.

In response to input of the pulse signal, the attitude calculating unit 72C reads a signal value of the boom cylinder stroke sensor 42 and calibrates the reference position.

The bucket 33 cannot be provided with an encoder, which is intended to be used in a waterproof environment. Accordingly, in order to detect that the reference position is passed, the bucket cylinder 36 is provided with a magnetic force sensor 44A to detect the passage of a magnet provided to the bucket cylinder 36.

Figure 6:
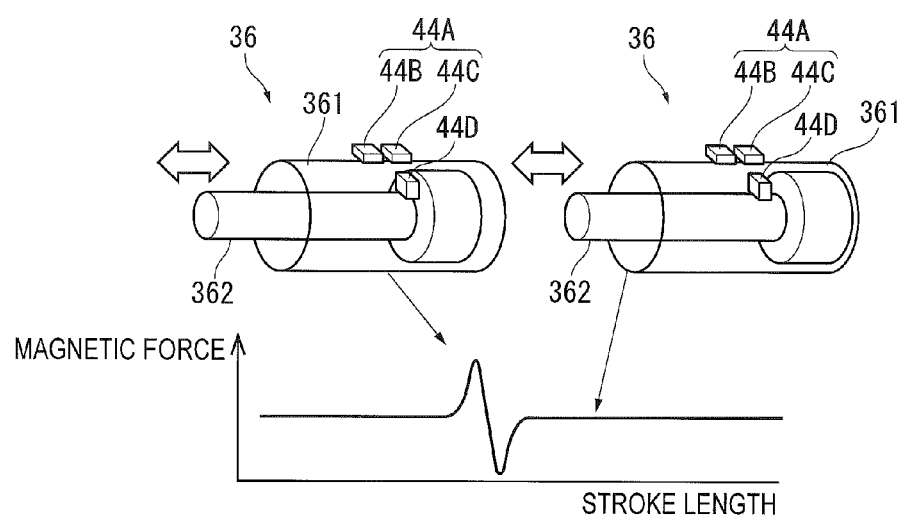
FIG. 6 is a schematic view showing an arrangement of a magnetic force sensor according to the exemplary embodiment.

As shown in FIG. 6, the magnetic force sensor 44A is attached to an outer surface of a cylinder tube 361 of the bucket cylinder 36. The magnetic force sensor 44A includes two sensors 44B, 44C spaced at a predetermined distance along a linear movement direction of a piston 362.

The sensors 44B, 44C are provided to known reference positions, and the piston 362 is provided with a magnet 44D generating magnetic lines. The sensors 44B, 44C each transmit the magnetic lines generated by the magnet 44D to detect a magnetic force (magnetic flux density), and output an electric signal (voltage) corresponding to the magnetic force (magnetic flux density).

The signal detected by each of the sensors 44B, 44C is outputted to the display controller 72. Based on the detection results of the sensors 44B, 44C, the display controller 72 resets a stroke position obtained from the detection result of the bucket cylinder stroke sensor 44 to the reference position.

The magnetic force sensor 44A, which magnetically detects the reference position, is likely to cause a variation in the stroke accuracy of the bucket 33, so that the detected stroke value of the bucket 33 may have a large error as compared with those of the boom 31 and the arm 32, which employ the encoders 42A, 43A as the reset sensors.

As shown in FIG. 2A, the work machine body 2 includes a position detector 45 that detects the current position of the work machine body 2 of the hydraulic excavator 1. The position detector 45 includes two antennas 46, 47 for real time kinematic-global navigation satellite systems (RTK-GNSS) shown in FIG. 1 and a position calculator 48 shown in FIG. 2A. It should be noted that the antennas 46, 47 may be provided to a handrail on the top of the upper structure 5.

The antennas 46, 47 are spaced from an origin O of the vehicle body coordinate system x-y-z (described later) along x-axis, y-axis and z-axis (see FIGS. 2A to 2C) respectively at predetermined distances (i.e., Lbdx, Lbdy, Lbdz).

A signal corresponding to a GNSS radio wave received by the antennas 46, 47 is inputted to the position calculator 48. The position calculator 48 detects the current position of each of the antennas 46, 47 in a global coordinate system. It should be noted that X-Y-Z denotes the global coordinate system, XY denotes a horizontal plane, and Z denotes a vertical direction. Further, the global coordinate system, which is a coordinate system based on GNSS measurement, is defined with its origin fixed on the earth.

In contrast, the vehicle body coordinate system (described later) is a coordinate system defined with its origin O fixed in the work machine body 2 (specifically, the upper structure 5).

The antenna 46, which may be referred to as "reference antenna 46", hereinafter), is intended for detection of the current position of the work machine body 2. The antenna 47, which may be referred to as "direction antenna 47", hereinafter), is intended for detection of an orientation of the work machine body 2 (specifically, the upper structure 5). Based on the respective positions of the reference antenna 46 and the direction antenna 47, the position detector 45 detects a direction angle of the x-axis of the vehicle body coordinate (described later) in the global coordinate system. It should be noted that the antennas 46, 47 may be GPS antennas.

As shown in FIGS. 2A, 2B, 2C, the work machine body 2 includes an inertial measurement unit (IMU) 49 that measures an inclination angle of the vehicle body. An angular velocity and an acceleration of each of a roll angle ($\theta 1$: see FIG. 2B) in a Y-direction and a pitch angle ($\theta 2$: see FIG. 2C) in an X-direction are outputted from the IMU 49.

Figure 3:
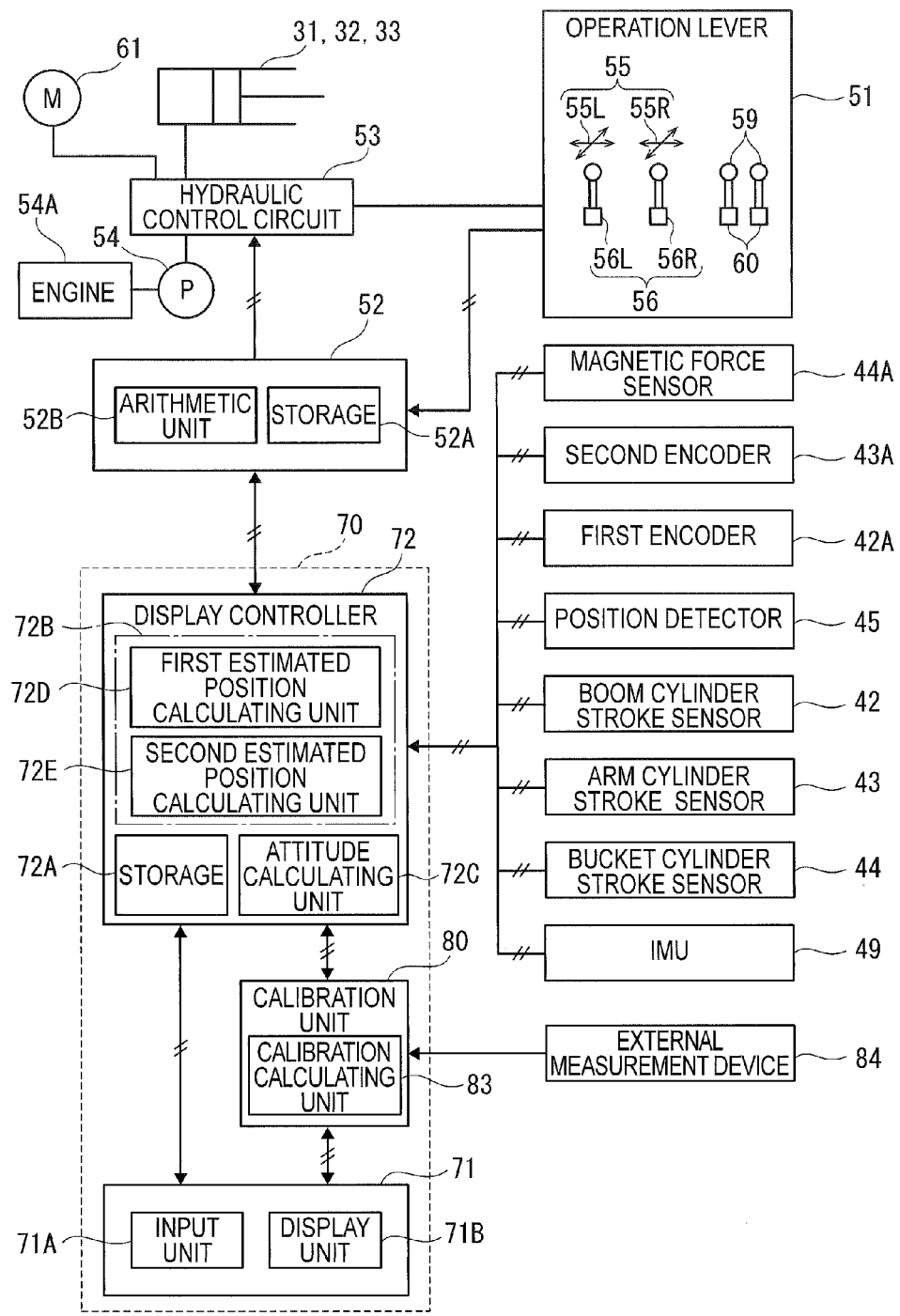
FIG. 3 is a control block diagram showing the work machine according to the exemplary embodiment.

FIG. 3 is a block diagram showing an arrangement of a control system of the hydraulic excavator 1.

The hydraulic excavator 1 includes the operation device 51, a working equipment controller 52, a hydraulic control circuit 53, the hydraulic pump 54, a hydraulic motor 61, the engine 54A and a display system 70.

The operation device 51 includes a working equipment operation lever 55 and a working equipment operation detecting unit 56.

The working equipment operation lever 55 includes right and left operation levers 55R, 55L. The left operation lever 55L is operated right and left to provide a command for turning the upper structure 5 right and left, and is operated back and forth to provide a dumping/excavation command to the arm 32. The right operation lever 55R is operated right and left to provide a dumping/excavation command to the bucket 33, and is operated back and forth to provide a command for vertically moving the boom 31.

Working equipment operation detecting units 56L, 56R detect the operation of the working equipment operation lever 55, and outputs the detected operation in the form of a detection signal to the working equipment controller 52. An operation command may be provided from the working equipment operation lever 55 to the hydraulic control circuit 53 in a pilot hydraulic manner or in an electrical lever manner. In the electrical lever manner, the operation command is converted into an electrical signal through, for instance, a potentiometer and inputted to the working equipment controller 52. In the pilot hydraulic method, a proportional valve is actuated with a pilot hydraulic pressure generated by a lever operation to regulate the flow rate of a hydraulic fluid. Further, a pilot pressure, which is detected by a pressure sensor, is converted into an electrical signal and inputted to the working equipment controller 52.

A travel operation lever 59 is operated by an operator to drive the hydraulic excavator 1. A travel operation detecting unit 60 supplies a hydraulic pressure to the hydraulic motor 61 of the undercarriage 4 in accordance with the operation of the travel operation lever 59.

The working equipment controller 52 includes a storage 52A (e.g., RAM or ROM) and an arithmetic unit 52B (e.g., CPU). The working equipment controller 52 mainly controls the movement of the working equipment 3. The working equipment controller 52 generates a control signal for moving the working equipment 3 in accordance with the operation of the working equipment operation lever 55, and outputs the control signal to the hydraulic control circuit 53.

The hydraulic control circuit 53, which includes hydraulic control equipment including a proportional control valve and an EPC valve, controls a flow rate of a hydraulic oil supplied to the hydraulic cylinders 34 to 36 from the hydraulic pump 54 based on the control signal from the working equipment controller 52.

The hydraulic cylinders 34 to 36 are actuated in accordance with the hydraulic oil supplied through the hydraulic control circuit 53 to move the working equipment 3.

When the proportional valve is actuated by the operation of a turning operation lever, the hydraulic motor 61 is driven to turn the upper structure 5. It should be noted that a rotary motor for driving the upper structure 5 may be not hydraulically but electrically driven.

The hydraulic excavator 1 includes the display system 70. The display system 70 is configured to provide an operator with information for excavating the ground in a work area into a designed landform (described later). The display system 70 includes the display input device 71, the display controller 72 and a calibration unit 80. It should be noted that the functions of the display system 70 may be provided in the form of individual controllers.

The display input device 71 includes an input unit 71A in the form of a touch panel and a display unit 71B, which may be a liquid crystal display (LCD). The display input device 71 displays a guide screen for providing the information for excavation. The guide screen may also display various keys, which are to be touched by an operator to perform the various functions of the display system 70.

The input unit 71A, which is used by an operator to input various types of information such as a measurement value, may be a keyboard or a touch panel.

The display controller 72 performs various functions of the display system 70. The display controller 72 and the working equipment controller 52 can communicate with each other through a wire or wirelessly. The display controller 72 includes a storage 72A, which may be a known device (e.g., RAM or ROM), a position calculating unit 72B (e.g., CPU) and the attitude calculating unit 72C.

The position calculating unit 72B performs various calculations for displaying the guide screen based on various types of data stored in the storage 72A and a detection result of the position detector 45.

Based on detection values of the cylinder stroke sensors 42 to 44, the attitude calculating unit 72C calculates attitude angles, i.e., the swing angle α of the boom 31, the swing angle β of the arm 32 and the swing angle γ of the bucket 33, from cylinder strokes detected by the cylinder stroke sensors 42 to 44 respectively provided to the boom 31, the arm 32 and the bucket 33. The attitude calculating unit 72C also allows the encoders 42A, 43A and the magnetic force sensor 44A to reset stroke values acquired by the cylinder stroke sensors 42 to 44 of the hydraulic cylinders. The attitude calculating unit 72C calculates a roll angle θ1 and a pitch angle θ2 of the hydraulic excavator 1 from the angular velocity and the acceleration obtained from the IMU 49.

Designed landform data is created in advance and stored in the storage 72A of the display controller 72. The designed landform data is information regarding a three-dimensional designed landform and the position thereof. The designed landform shows a target form of the ground to be excavated. The display controller 72 displays the guide screen on the display input device 71 based on the designed landform data and data such as the detection results of the various sensors.

The storage 72A also stores a working equipment parameter.

3. Method for Calculating Position of Blade Edge P of Bucket 33

Next, the method for calculating the position of the blade edge P of the bucket 33 will be described in detail. The attitude calculating unit 72C of the display controller 72 calculates an estimated position of the blade edge P of the bucket 33 based on the detection value of the position detector 45 and a plurality of parameters stored in the storage 72A.

The parameters include the working equipment parameter and an antenna parameter. The working equipment parameter includes a plurality of parameters indicating the respective dimensions and swing angles of the boom 31, the arm 32 and the bucket 33. The antenna parameter includes a plurality of parameters indicating a positional relationship between each of the antennas 46, 47 and the boom 31.

As shown in FIG. 3, the position calculating unit 72B of the display controller 72 includes a first estimated position calculating unit 72D and a second estimated position calculating unit 72E. The first estimated position calculating unit 72D calculates an estimated position of the blade edge P of the bucket 33 in the vehicle body coordinate system based on the working equipment parameter(s).

The second estimated position calculating unit 72E calculates an estimated position of the blade edge P of the bucket 33 in the global coordinate system from: the antenna parameter; the respective estimated positions of the antennas 46, 47 in the global coordinate system detected by the position detector 45; and the estimated position of the blade edge P of the bucket 33 in the vehicle body coordinate system calculated by the first estimated position calculating unit 72D. Specifically, the estimated position of the blade edge P of the bucket 33 is calculated as follows.

First, as shown in FIG. 2, the vehicle body coordinate system x-y-z is defined with its origin O at a rotation center of the upper structure 5. It should be noted that the x-axis of the vehicle body coordinate system corresponds to a front-and-rear direction of the vehicle body, the y-axis corresponds to a right-and-left direction of the vehicle body, and the z-axis corresponds to a vertical direction of the vehicle body.

The boom pin 37 is defined as a reference position of the hydraulic excavator 1 hereinbelow. The position of the boom pin 37 (i.e., a position of a midpoint of the boom pin 37 in a vehicle-width direction) is actually defined as the coordinates of the position of the boom pin 37 in the vehicle body coordinate system. The reference position of the hydraulic excavator 1 may be anywhere on the upper structure 5.

Based on the detection results of the cylinder stroke sensors 42, 43, 44, the current swing angles α, β, γ of the boom 31, the arm 32 and the bucket 33 are calculated.

The coordinates (x, y, z) of the blade edge P of the bucket 33 in the vehicle body coordinate system are calculated from the swing angles α, β, γ of the boom 31, the arm 32 and the bucket 33 and lengths L1, L2, L3 of the boom 31, the arm 32 and the bucket 33 (work parameters) by the following equations (1).

Equations 1

$$x = L1\sin\alpha + L2\sin(\alpha+\beta) + L3\sin(\alpha+\beta+\gamma)$$

$$y = 0$$

$$z = L1\cos\alpha + L2\cos(\alpha+\beta) + L3\cos(\alpha+\beta+\gamma) \quad (1)$$

The coordinates (x, y, z) of the blade edge P of the bucket 33 in the vehicle body coordinate system calculated by the equations (1) are converted into coordinates (X, Y, Z) in the global coordinate system by the following equation (2).

Equation 2

$$\begin{pmatrix} X \\ Y \\ Z \end{pmatrix} = \begin{pmatrix} \cos\kappa\cos\varphi & \begin{matrix}\cos\kappa\sin\varphi\sin\omega + \\ \sin\kappa\cos\omega\end{matrix} & \begin{matrix}-\cos\kappa\sin\varphi\cos\omega + \\ \sin\kappa\sin\omega\end{matrix} \\ -\sin\kappa\cos\varphi & \begin{matrix}-\sin\kappa\sin\varphi\sin\omega + \\ \cos\kappa\cos\omega\end{matrix} & \begin{matrix}\sin\kappa\sin\varphi\cos\omega + \\ \cos\kappa\sin\omega\end{matrix} \\ \sin\varphi & -\cos\varphi\sin\omega & \cos\varphi\cos\omega \end{pmatrix} \begin{pmatrix} x \\ y \\ z \end{pmatrix} + \begin{pmatrix} A \\ B \\ C \end{pmatrix} \quad (2)$$

In the above equation, ω, φ and κ are represented by the following equations (3).

Equation 3

$$\omega = \arcsin\left(\frac{\sin\theta 1}{\cos\varphi}\right) \quad (3)$$

$$\varphi = \theta 2$$

$$\kappa = -\theta 3$$

In the above equations, θ1 represents the roll angle as described above. θ2 represents the pitch angle. As shown in FIG. 2(C), θ3 represents the yaw angle, which corresponds to the direction angle of the x-axis of the vehicle body coordinate system in the global coordinate system. The yaw angle θ3 is thus calculated based on the respective positions of the reference antenna 46 and the direction antenna 47 detected by the position detector 45. (A, B, C) represents the coordinates of the origin of the vehicle body coordinate system in the global coordinate system.

The antenna parameter indicates a positional relationship between each of the antennas 46, 47 and the origin of the vehicle body coordinate system (i.e., a positional relationship between each of the antennas 46, 47 and the midpoint of the boom pin 37 in the vehicle-width direction).

Specifically, as shown in FIGS. 2B and 2C, the antenna parameter includes: a distance Lbbx between the boom pin 37 and the reference antenna 46 in an x-axis direction in the vehicle body coordinate system; a distance Lbby between the boom pin 37 and the reference antenna 46 in a y-axis direction in the vehicle body coordinate system; and a distance Lbbz between the boom pin 37 and the reference antenna 46 in a z-axis direction in vehicle body coordinate system. In addition, the antenna parameter includes: a distance Lbdx between the boom pin 37 and the direction antenna 47 in the x-axis direction in the vehicle body coordinate system; a distance Lbdy between the boom pin 37 and the direction antenna 47 in the y-axis direction in the vehicle body coordinate system; and a distance Lbdz between the boom pin 37 and the direction antenna 47 in the z-axis direction in vehicle body coordinate system.

(A, B, C) is calculated based on the respective coordinates of the antennas 46, 47 in the global coordinate system detected by the antennas 46, 47 and the antenna parameter.

The display controller 72 calculates a distance between the three-dimensional designed landform and the blade edge P of the bucket 33 based on the current position of the blade edge P of the bucket 33 calculated as described above and the designed landform data stored in the storage 72A. The calculated distance may be displayed on the display unit 71B and/or may be used as a parameter for excavation control.

Next, description will be made on a method for calculating the current swing angles α, β, γ of the boom 31, the arm 32 and the bucket 33 based on the detection results of the cylinder stroke sensors 42, 43, 44.

Figure 7:
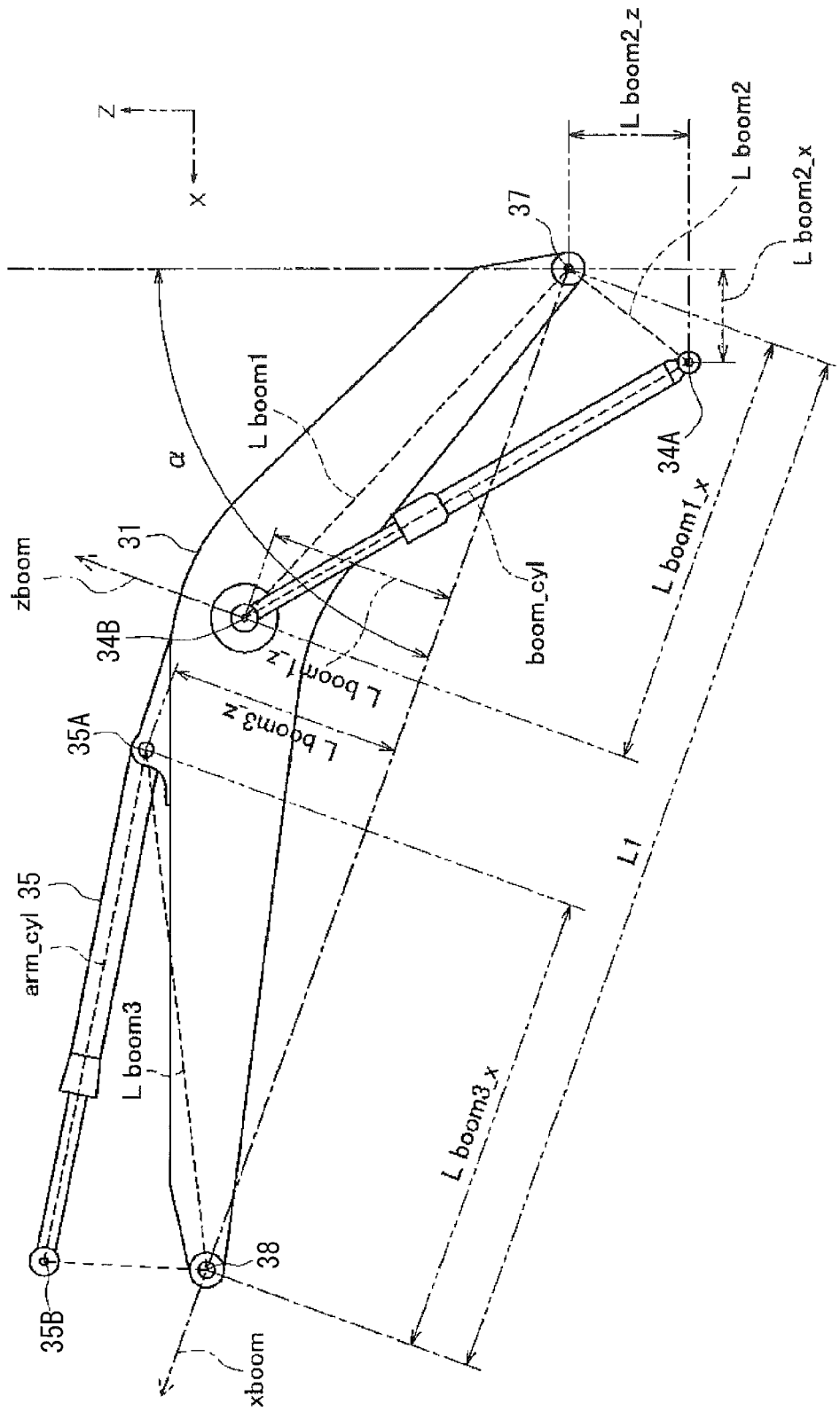
FIG. 7 is a side view showing a boom of the work machine according to the exemplary embodiment.

FIG. 7 is a side view showing the boom 31. The swing angle α of the boom 31 is represented by the following equation (4) using the working equipment parameters shown in FIG. 7.

Equation 4

$$\alpha = \pi - \arctan\left(\frac{Lboom2\_x}{Lboom2\_z}\right) - \arccos\left(\frac{Lboom1^2 + Lboom2^2 - boom\_cyl^2}{2*Lboom1*Lboom2}\right) + \arctan\left(\frac{Lboom1\_z}{Lboom1\_x}\right) \quad (4)$$

As shown in FIG. 7, Lboom2_x (a working equipment parameter of the boom 31) represents a distance between the boom cylinder foot pin 34A and the boom pin 37 in a horizontal direction of the work machine body 2 where the boom 31 is attached (corresponding to the x-axis direction in the vehicle body coordinate system). Lboom2_z (a working equipment parameter of the boom 31) represents a distance between the boom cylinder foot pin 34A and the boom pin 37 in a vertical direction of the work machine body 2 where the boom 31 is attached (corresponding to the z-axis direction in the vehicle body coordinate system). Lboom1 (a working equipment parameter of the boom 31) represents a distance between the boom cylinder top pin 34B and the boom pin 37. Lboom2 (a working equipment parameter of the boom 31) represents a distance between the boom cylinder foot pin 34A and the boom pin 37. boom_cyl (a working equipment parameter of the boom 31) represents a distance between the boom cylinder foot pin 34A and the boom cylinder top pin 34B. Lboom1 (a working equipment parameter of the boom 31) represents a distance between the boom cylinder top pin 34B and the boom pin 37 in a zboom-axial direction. It should be noted that a direction connecting the boom pin 37 and the arm pin 38 in a side view is defined as an xboom axis, and a direction perpendicular to the xboom axis is defined as a zboom axis. Lboom1_x (a working equipment parameter of the boom 31) represents a distance between the boom cylinder top pin 34B and the boom pin 37 in an xboom-axial direction.

Figure 8:
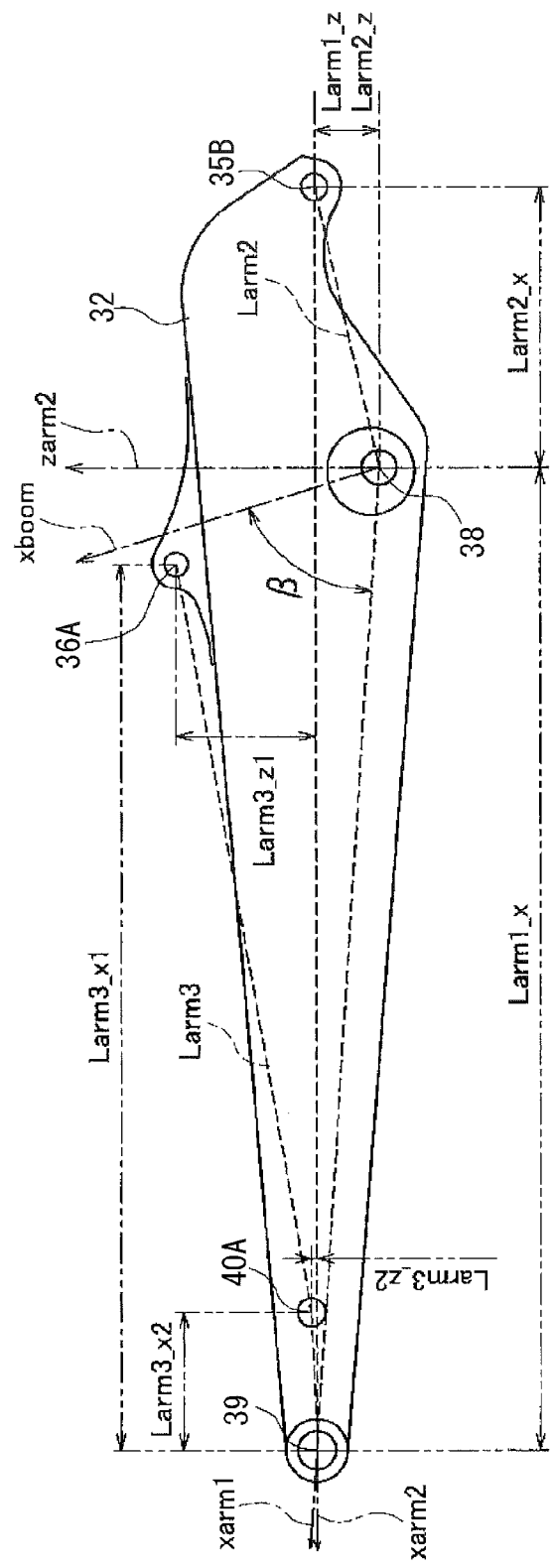
FIG. 8 is a side view showing an arm of the work machine according to the exemplary embodiment.

FIG. 8 is a side view showing the arm 32. The swing angle β of the arm 32 is represented by the following equation (5) using the working equipment parameters shown in FIGS. 7 and 8.

Equation 5

$$\beta = \arctan\left(\frac{Lboom3\_z}{Lboom3\_x}\right) + \arccos\left(\frac{Lboom3^2 + Larm2^2 - arm\_cyl^2}{2*Lboom3*Larm2}\right) + \arctan\left(\frac{Larm2\_z}{Larm2\_x}\right) + \arctan\left(\frac{Larm1\_x}{Larm1\_z}\right) - \pi \quad (5)$$

As shown in FIG. 8, Lboom3_z (a working equipment parameter of the boom 31) represents a distance between the arm cylinder foot pin 35A and the arm pin 38 in the zboom-axial direction. Lboom3_x (a working equipment parameter of the boom 31) represents a distance between the arm cylinder foot pin 35A and the arm pin 38 in the xboom-axial direction. Lboom3 (a working equipment parameter of the boom 31) represents a distance between the arm cylinder foot pin 35A and the arm pin 38. As shown in FIG. 8, Larm2 (a working equipment parameter of the arm 32) represents a distance between the arm cylinder top pin 35B and the arm pin 38. As shown in FIG. 7, arm_cyl (a working equipment parameter of the arm 32) represents a distance between the arm cylinder foot pin 35A and the arm cylinder top pin 35B.

As shown in FIG. 8, Larm2_x (a working equipment parameter of the arm 32) represents a distance between the arm cylinder top pin 35B and the arm pin 38 in an xarm2-axial direction. Larm2_z (a working equipment parameter of the arm 32) represents a distance between the arm cylinder top pin 35B and the arm pin 38 in a zarm2-axial direction.

It should be noted that a direction connecting the arm cylinder top pin 35B and the bucket pin 39 in a side view is defined as an xarm2 axis, and a direction perpendicular to the xarm2 axis is defined as a zarm2 axis. Larm1_x (a working equipment parameter of the arm 32) represents a distance between the arm pin 38 and the bucket pin 39 in the xarm2-axial direction. Larm1_z (a working equipment parameter of the arm 32) represents a distance between the arm pin 38 and the bucket pin 39 in the zarm2-axial direction. Further, a direction connecting the arm pin 38 and the bucket pin 39 in a side view is defined as an xarm1 axis. The swing angle β of the arm 32 is an angle between the xboom axis and the xarm1 axis.

Figure 9:
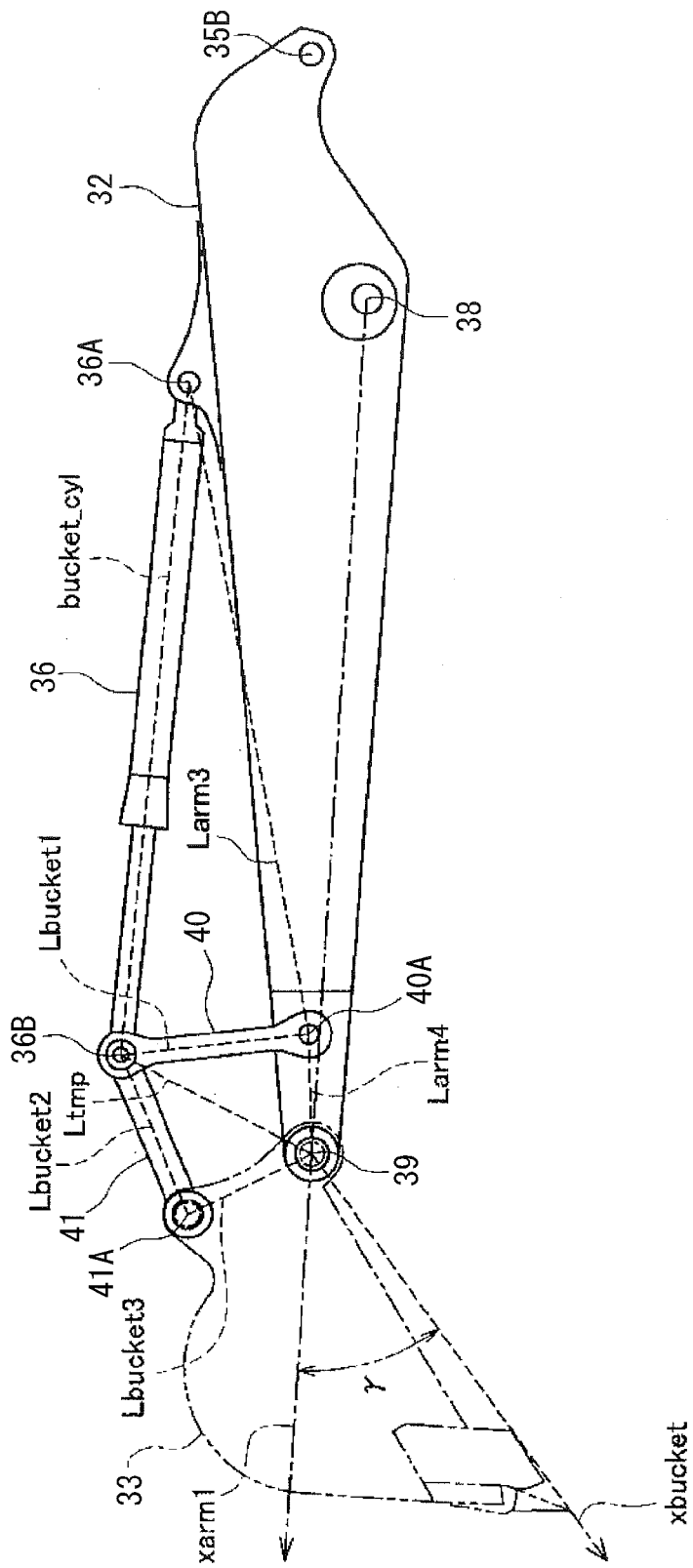
FIG. 9 is a side view showing the arm and bucket of the work machine according to the exemplary embodiment.
Figure 10:
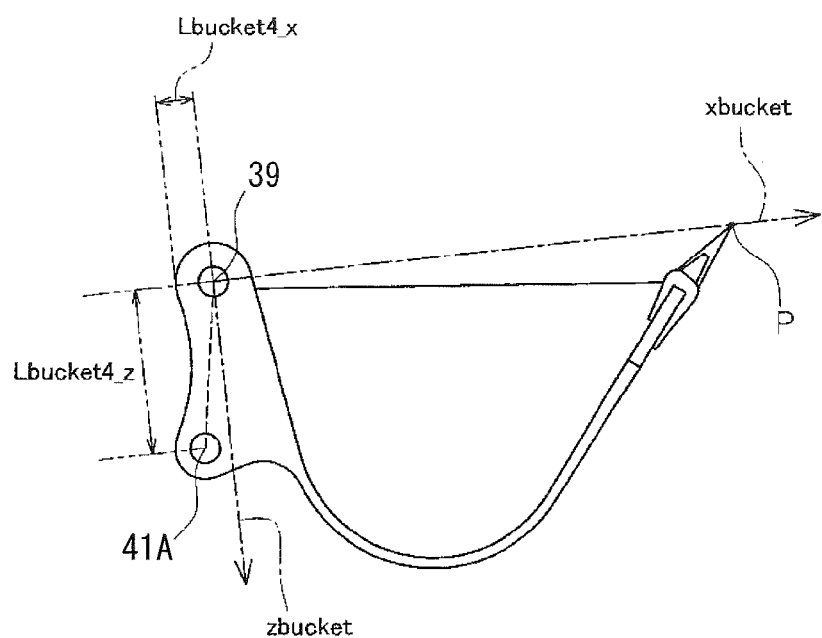
FIG. 10 is a side view showing the bucket of the work machine according to the exemplary embodiment.

FIG. 9 is a side view showing the bucket 33 and the arm 32. FIG. 10 is a side view showing the bucket 33. The swing angle γ of the bucket 33 is represented by the following equation (6) using the working equipment parameters shown in FIGS. 7 to 10.

Equation 6

$$\gamma = \arctan\left(\frac{Larm1\_z}{Larm1\_x}\right) + \arctan\left(\frac{Larm3\_z2}{Larm3\_x2}\right) + \arccos\left(\frac{Lmp^2 + Larm4^2 - Lbucket1^2}{2*Lmp*Larm4}\right) + \arccos\left(\frac{Lmp^2 + Lbucket3^2 - Lbucket2^2}{2*Lmp*Lbucket3}\right) + \arctan\left(\frac{Lbucket4\_x}{Lbucket4\_z}\right) + \frac{\pi}{2} - \pi \quad (6)$$

As shown in FIG. 8, Larm3_z2 (a working equipment parameter of the arm 32) represents a distance between the first link pin 40A and the bucket pin 39 in the zarm2-axial direction. Larm3_x2 (a working equipment parameter of the arm 32) represents a distance between the first link pin 40A and the bucket pin 39 in the xarm2-axial direction.

As shown in FIG. 10, Ltmp (a working equipment parameter of the arm 32) represents a distance between the bucket cylinder top pin 36B and the bucket pin 39. Larm4 (a working equipment parameter of the arm 32) represents a distance between the first link pin 40A and the bucket pin 39. Lbucket1 (a working equipment parameter of the bucket 33) represents a distance between the bucket cylinder top pin 36B and the first link pin 40A. Lbucket3 (a working equipment parameter of the bucket 33) represents a distance between the bucket pin 39 and the second link pin 41A. Lbucket2 (a working equipment parameter of the bucket 33) represents a distance between the bucket cylinder top pin 36B and the second link pin 41A.

As shown in FIG. 10, Lbucket4_x (a working equipment parameter of the bucket 33) represents a distance between the bucket pin 39 and the second link pin 41A in an xbucket-axial direction. Lbucket4_z (a working equipment parameter of the bucket 33) represents a distance between the bucket pin 39 and the second link pin 41A in a zbucket-axial direction.

It should be noted that a direction connecting the bucket pin 39 and the blade edge P of the bucket 33 in a side view is defined as an xbucket axis, and a direction perpendicular to the xbucket axis is defined as a zbucket axis. The swing angle γ of the bucket 33 is an angle between the xbucket axis and the xarm1 axis. Ltmp described above is represented by the following equation (7).

Equation 7

$$Ltmp = \sqrt{Larm4^2 + Lbucket1^2 - 2Larm4*Lbucket1*\cos\phi} \quad (7)$$

$$\phi = \pi + \sqrt{\frac{Larm3\_z2}{Larm3\_x2}} - \sqrt{\frac{Larm3\_z1 - Larm3\_z2}{Larm3\_x1 - Larm3\_x2}} - \arccos\left\{\frac{Lbucket1^2 + Larm3^2 - bucket\_cyl^2}{2*Lbucket1*Larm3}\right\}$$

Figure 11:
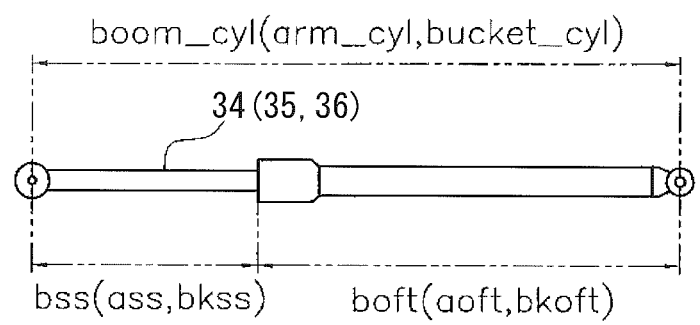
FIG. 11 is a side view showing a cylinder of the work machine according to the exemplary embodiment.

As shown in FIG. 8, Larm3 (a working equipment parameter of the arm 32) represents a distance between the bucket cylinder foot pin 36A and the first link pin 40A. Larm3_x1 (a working equipment parameter of the arm 32) represents a distance between the bucket cylinder foot pin 36A and the bucket pin 39 in the xarm2-axial direction. Larm3_z1 (a working equipment parameter of the arm 32) represents a distance between the bucket cylinder foot pin 36A and the bucket pin 39 in the zarm2-axial direction.

boom_cyl described above is a value obtained by adding a boom cylinder offset working parameter boft (a working equipment parameter of the boom 31) to a stroke length bss of the boom cylinder 34 detected by the boom cylinder stroke sensor 42, as shown in FIG. 11. Similarly, arm_cyl is a value obtained by adding an arm cylinder offset working equipment parameter aoft (a working equipment parameter of the arm 32) to a stroke length as of the arm cylinder 35 detected by the arm cylinder stroke sensor 43. Similarly, bucket_cyl is a value obtained by adding a bucket cylinder offset working equipment parameter bkoft (a working equipment parameter of the bucket 33 including a minimum distance of the bucket cylinder 36) to a stroke length bkss of the bucket cylinder 36 detected by the bucket cylinder stroke sensor 44.

4. Arrangement of Calibration Unit 80

The calibration unit 80 shown in FIG. 3 is a unit for calibrating the working equipment parameter(s) necessary for calculating the swing angles α, β, γ and the position of the blade edge P of the bucket 33 in the hydraulic excavator 1.

The calibration unit 80, which includes a calibration calculating unit 83, defines a calibration device for calibrating the working equipment parameter(s) in combination with the hydraulic excavator 1 and an external measurement device 84. The external measurement device 84 is a device for measuring the position of the blade edge P of the bucket 33, and may be a total station. The calibration unit 80 is capable of data communication with the display controller 72 through an in-vehicle communication.

The calibration unit 80 includes a measurement value acquiring unit 83A (described later), which is capable of data communication with the external measurement device 84 through the in-vehicle communication.

The calibration calculating unit 83, which may be a CPU, calibrates the working equipment parameter(s) based on a measurement value measured by the external measurement device 84. The calibration of the working equipment parameter(s) may be performed before shipment of the hydraulic excavator 1 or at initialization after maintenance.

A calibration result of the work parameter(s) is displayed on the display unit 71B of the display input device 71 to show whether the calibration is successfully performed or another calibration needs to be performed.

Figure 12:
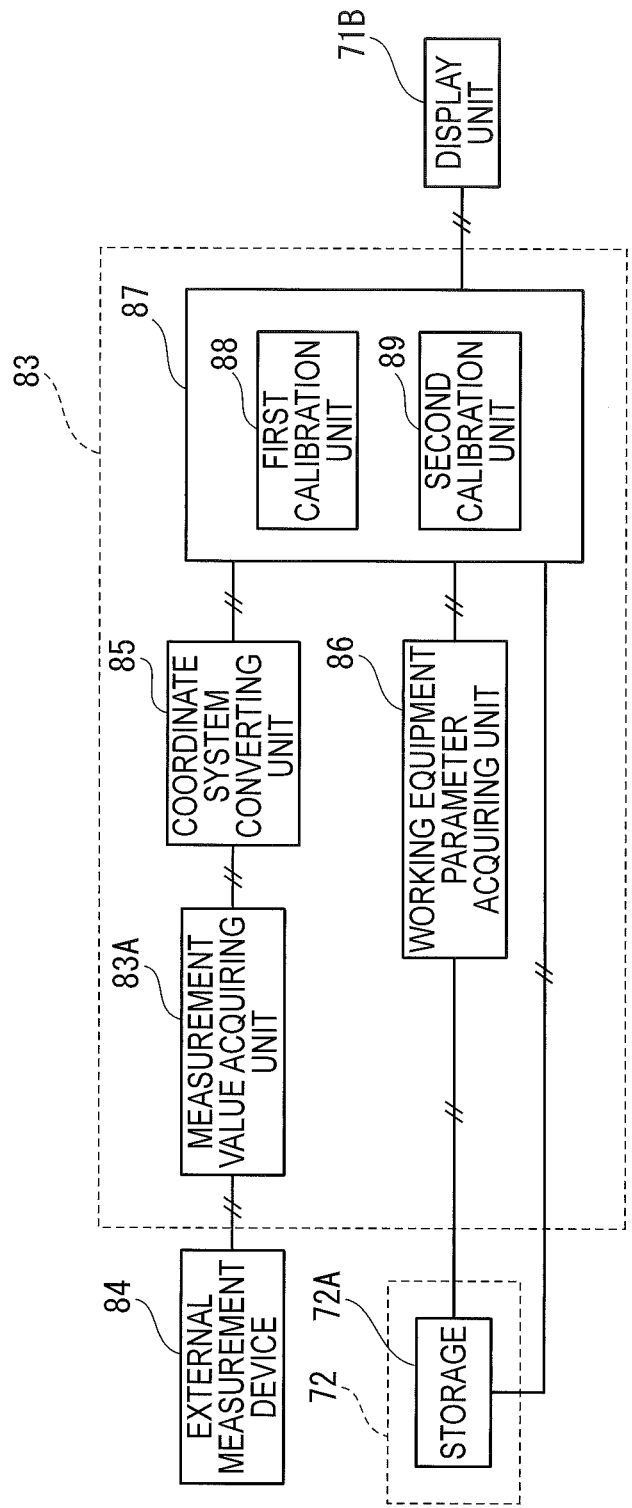
FIG. 12 is a functional block diagram showing a calibration device in the work machine according to the exemplary embodiment.

Specifically, as shown in a functional block diagram of FIG. 12, the calibration calculating unit 83 includes the measurement value acquiring unit 83A, a coordinate system converting unit 85, a working equipment parameter acquiring unit 86 and a parameter calibration unit 87.

The coordinate system converting unit 85 is a unit for converting the measurement value measured by the external measurement device 84 into a value according to the vehicle body coordinate system. Specifically, after being converted into the value according to the vehicle body coordinate system (the conversion into the value according to the vehicle body coordinate system will be described later in detail), the measurement value is outputted to the parameter calibration unit 87.

The working equipment parameter acquiring unit 86 is a unit for reading a default value of the working equipment parameter(s) stored in the storage 72A of the display controller 72, and the read value of the working equipment parameter(s) is outputted to the parameter calibration unit 87. It should be noted that the default value of the working equipment parameter(s) may be selected from among the value shown in the figure(s), a value obtained by, for instance, dimensional measurement, and a previously calibration value, as needed.

The parameter calibration unit 87 is a unit for calibrating the default value of the working equipment parameter(s) outputted from the working equipment parameter acquiring unit 86 based on the measurement value, which has been converted into the value according to the vehicle body coordinate system by the coordinate system converting unit 85. The parameter calibration unit 87 includes a first calibration unit 88 and a second calibration unit 89.

The first calibration unit 88 is a unit for calibrating the working equipment parameter(s) of the boom 31 and the arm 32 acquired by the working equipment parameter acquiring unit 86.

The second calibration unit 89 is a unit for calibrating the working equipment parameter(s) of the bucket 33 based on the working equipment parameter(s) of the boom 31 and the arm 32 calibrated by the first calibration unit 88.

The calibration units 88, 89 of the parameter calibration unit 87 output the calibrated working equipment parameter(s) of the boom 31, the arm 32 and the bucket 33 to the display unit 71B.

5. Calibration Process Performed by Calibration Unit 80

5-1. Measurement by External Measurement Device 84

Figure 13:
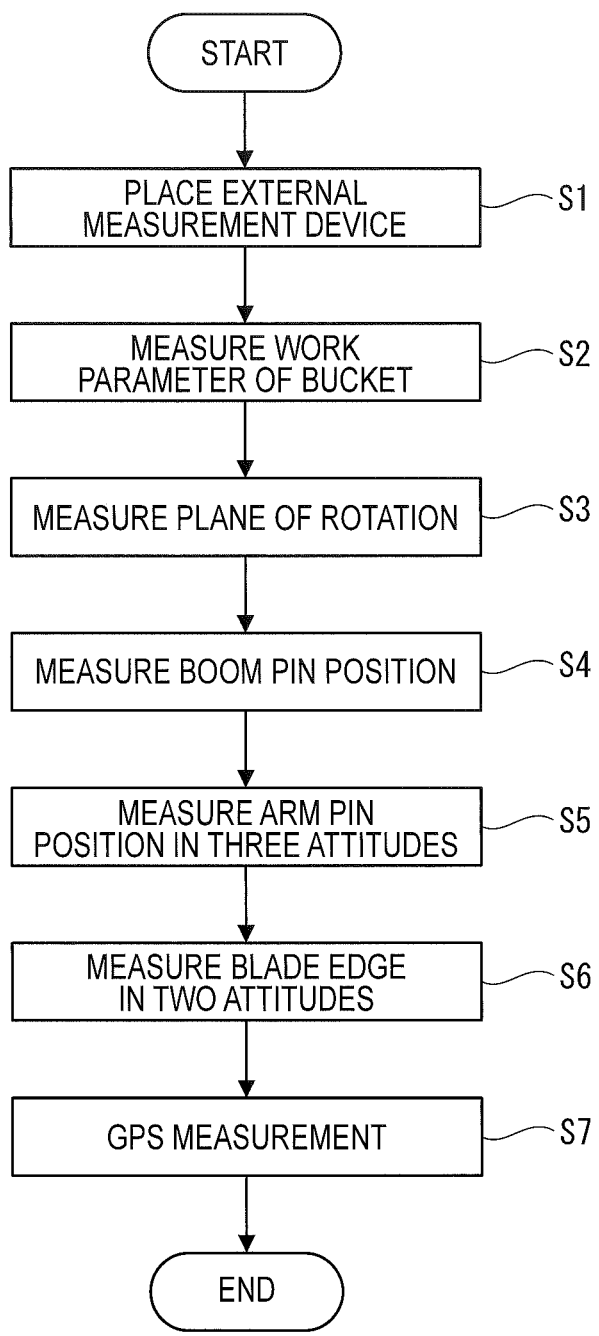
FIG. 13 is a flow chart showing a measurement process of the work machine, which is performed by an external measurement device, according to the exemplary embodiment.

FIG. 13 is a flow chart showing an operation process for calibration that is to be performed by a measuring person.

The measuring person first places the external measurement device 84 at a position squarely facing a lateral side of the boom pin 37 at a predetermined distance (Step S1).

The measuring person then performs measurement of the working equipment parameter (e.g., an angle) defining a positional relationship between a contour point of the bucket 33 and a bucket connected position (the bucket pin 39) (Step S2). The dimension of the bucket 33 may be measured using the external measurement device 84 (working equipment dimension measurement) or may alternatively be directly measured with a measure or the like without using the external measurement device 84. In the latter case, the measurement value may be manually inputted by an operator using the input unit 71A of the display input device 71.

The measuring person performs measurement of a plane of rotation using the external measurement device 84 (Step S3). In order to measure the plane of rotation using the total station, a position of a upper structure is measured with a rotation angle (the yaw angle $\theta 3$) of the upper structure being changed for a plurality of times. The position of the upper structure may be measured by emitting an optical beam from the total station and detecting a reflected light from a maker such as a prism attached to, for instance, a counterweight provided to a rear portion of the work machine body 2 of the hydraulic excavator 1. The above measurement may be repeated at three spots on a locus of rotation to measure the plane of rotation.

Figure 14:
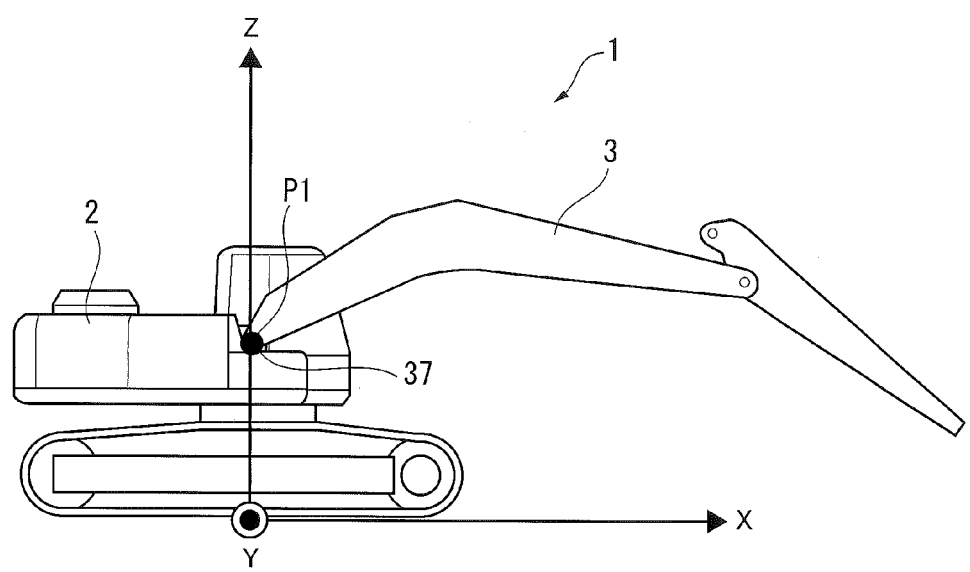
FIG. 14 is a schematic view for explaining a measurement method of a position of a boom pin of the work machine according to the exemplary embodiment.

The measuring person measures a lateral-side center position P1 of the boom pin 37 shown in FIG. 14 using the external measurement device 84 (Step S4).

After completion of the measurement of the lateral-side center position P1 of the boom pin 37, an operator operates the boom 31 and the arm 32 to position the boom 31 and the arm 32 in a plurality of work attitudes. The measuring person measures the position of the bucket pin 39 provided to the distal end of the arm 32 in each work attitude (Step S5). The position of the bucket pin 39 is measured in each of three attitudes: a position P2 where the boom 31 is fully raised; a position P3 where the boom 31 and the arm 32 are both extended in a work direction; and a position P4 where the boom 31 is extended in the work direction with the arm 32 being retracted. It should be noted that the position of the bucket pin 39 may be measured in any attitude different from the three attitudes.

Next, the operator operates the bucket 33 to position the bucket 33 in a plurality of bucket attitudes. The measuring person measures the position of the blade edge P of the bucket 33 (Step S6). The position of the blade edge P of the bucket 33 is measured in each of two attitudes with the blade edge P being situated at: a position P5 where the bucket 33 is extended; and a position P6 where the bucket 33 is retracted. It should be noted that the bucket 33 may be measured in any attitude different from the two attitudes.

The measuring person measures a GPS position at the end of the process (Step S7).

It should be noted that the resulting measurement values in Steps S2 to S7 are outputted to the measurement value acquiring unit 83A of the calibration unit 80 after each measurement, and the measurement values inputted from the external measurement device 84 are each subjected to coordinate conversion from the global coordinate system into the vehicle body coordinate system by the coordinate system converting unit 85.

5-2. Calibration Process Performed by Calibration Unit 80

Figure 17:
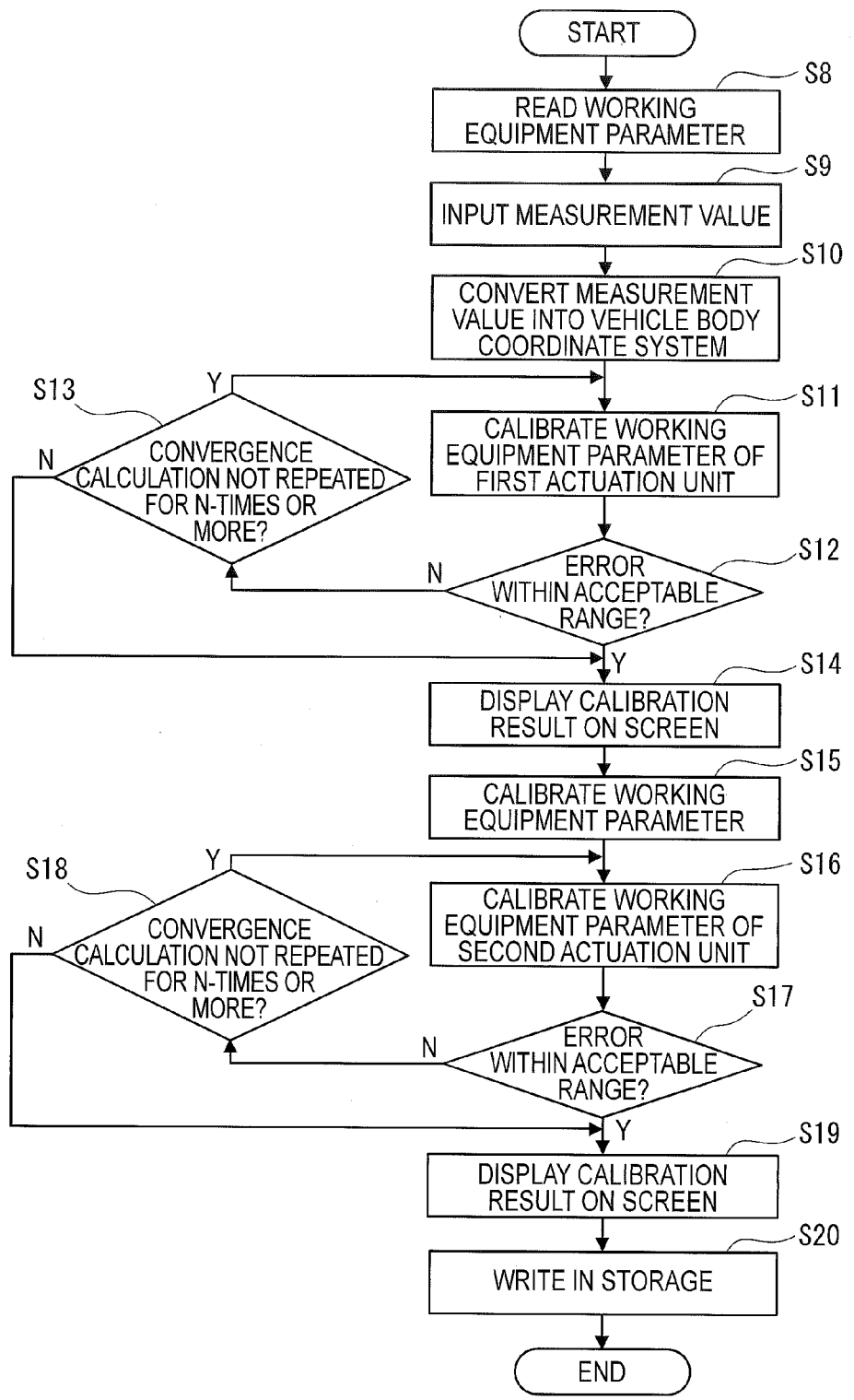
FIG. 17 is a flow chart for explaining effects of the exemplary embodiment.

Next, description will be made on a parameter calibration process that is to be performed by the calibration unit 80 with reference to a flow chart of FIG. 17.

The working equipment parameter acquiring unit 86 reads the working equipment parameter(s) from the storage 72A of the display controller 72 and outputs the working equipment parameter(s) to the parameter calibration unit 87 (Step S8).

The measurement values outputted from the external measurement device 84 are each inputted to the measurement value acquiring unit 83A (Step S9). The coordinate system converting unit 85 converts each of the measurement values inputted to the measurement value acquiring unit 83A into a value according to the vehicle body coordinate system (Step S10).

Figure 15:
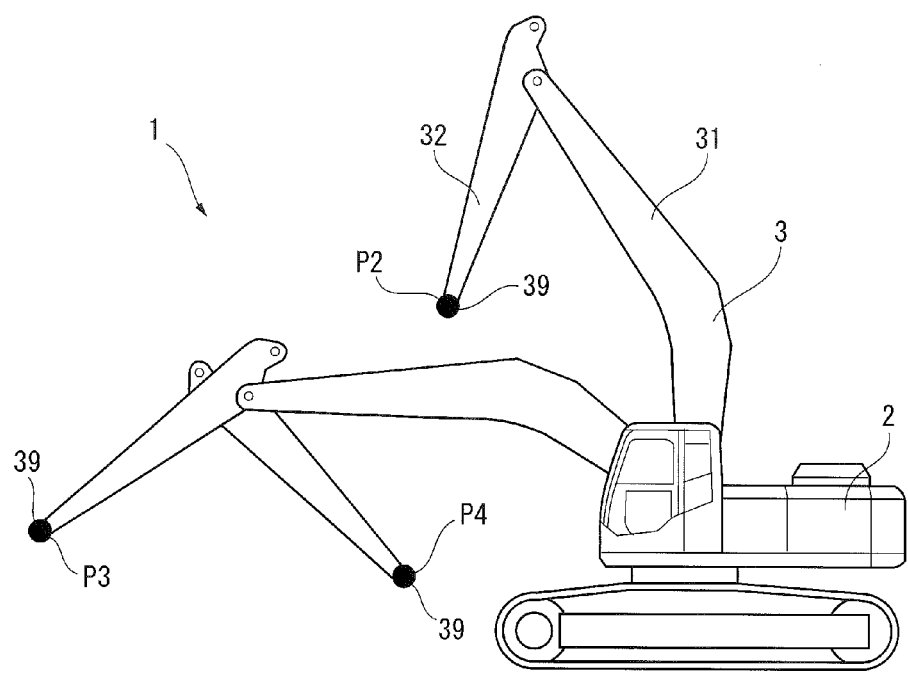
FIG. 15 is a schematic view for explaining a measurement method of a position of a bucket pin of the work machine according to the exemplary embodiment.

Each of the measurement values is converted into a value according to the vehicle body coordinate system by a method including: determining a work plane of the working equipment 3 from the measurement positions P2 to P4 of the bucket pin 39 shown in FIG. 15; determining a unit normal vector of the work plane and the coordinates of the centroid: and projecting the measurement position P1 of the boom pin 37 shown in FIG. 14 onto the work plane of the boom pin 37.

Next, the plane of rotation and a unit normal vector thereof are determined. The cross product of the two normal vectors of the plane of rotation and the work plane is then taken to determine a front-and-rear direction vector of the hydraulic excavator 1.

Based on the determined front-and-rear direction vector and the determined work plane, a vertical direction vector (a vector perpendicular to the front-and-rear direction and set within the work plane) is determined. Further, based on the determined front-and-rear direction vector and the determined plane of rotation, a right-and-left direction vector (a vector perpendicular to the front-and-rear direction and set within the plane of rotation) is determined.

Based on the front-and-rear direction, right-and-left direction and vertical direction, a rotation matrix for conversion from the coordinate system of the measurement values into the vehicle body coordinate system is determined, and the measurement values are converted into position information according to the vehicle body coordinate system with its origin fixed at the boom pin 37.

Next, the first calibration unit 88 determines the working equipment parameter(s) of the boom 31 and the arm 32 by convergence calculation based on the coordinates of the measurement positions P2 to P4 and the corresponding attitudes calculated by the attitude calculating unit 72C (Step S11). Specifically, convergence calculation of a calibration value of the working equipment parameter(s) is performed by a least squares method as shown in the following equation (8).

Equation 8

$$J_1 = \frac{1}{2}\sum_{k=1}^{n}\{L1\sin(\alpha k) + L2\sin(\alpha k + \beta k)\}^2 + \frac{1}{2}\sum_{k=1}^{n}\{L1\cos(\alpha k) + L2\cos(\alpha k + \beta k)\}^2 \quad (8)$$

A value of k corresponds to the measurement positions P2 to P4 shown in FIG. 15. Therefore, n is equal to 3. (x1, z1) are the coordinates of the measurement position P2 in the vehicle body coordinate system. (x2, z2) are the coordinates of the measurement position P3 in the vehicle body coordinate system. (x3, z3) are the coordinates of the measurement position P4 in the vehicle body coordinate system. A point where the function $J_1$ of the equation (8) has a minimum value is found to calculate the calibration value of the working equipment parameter(s).

The first calibration unit 88 determines whether or not the value of the equation (8) falls within a predetermined acceptable range (Step S12).

When an error is out of the acceptable range, the first calibration unit 88 determines whether or not the convergence calculation is repeated for a predetermined number of times or less (Step S13). When the convergence calculation is not repeated for the predetermined number (N) or more, the process returns to Step S11.

When the convergence calculation is repeated for the predetermined number of times (N), the first calibration unit 88 commands the display unit 71B to display information for informing the measuring person and the operator of a failure of the convergence calculation to inhibit the process from further proceeding (Step S14).

The measuring person and the operator then get back to Step S8 and repeat the process from Step S8 to Step S11.

When determining that the error falls within the predetermined acceptable range, the first calibration unit 88 commands the display unit 71B to display information for informing the measuring person and the operator of a fact that the error falls within the acceptable range (Step S14), calibrates the working equipment parameter(s) (Step S15), and permits the process to further proceed.

The first calibration unit 88 outputs the calibrated working equipment parameter(s) of the boom 31 and the arm 32 to the second calibration unit 89.

The second calibration unit 89 calculates a calibration value of the working equipment parameter(s) of the bucket 33 by convergence calculation based on the working equipment parameter(s) calibrated by the first calibration unit 88, the measurement values of the measurement positions in the plurality of working equipment attitudes (i.e., the measurement positions P5, P6), and the attitudes corresponding to the measurement positions P5, P6 calculated by the attitude calculating unit 72C (Step S16). Specifically, the second calibration unit 89 calculates the working equipment parameter(s) by convergence calculation based on the coordinates of the measurement position in the plurality of bucket attitudes (i.e., the measurement positions P5, P6) and the cylinder stroke lengths corresponding to the measurement positions P5, P6. The convergence calculation of the calibration value of the working equipment parameter(s) is thus performed as shown in the following equation (9).

Equation 9

$$J_2 = \frac{1}{2}\sum_{k=1}^{n}\{L1\sin(\alpha k) + L2\sin(\alpha k + \beta k) + L3\sin(\alpha k + \beta k + \gamma k) - xk\}^2 + \frac{1}{2}\sum_{k=1}^{n}\{L1\cos(\alpha k) + L2\cos(\alpha k + \beta k) + L3\cos(\alpha k + \beta k + \gamma k) - zk\}^2$$

Figure 16:
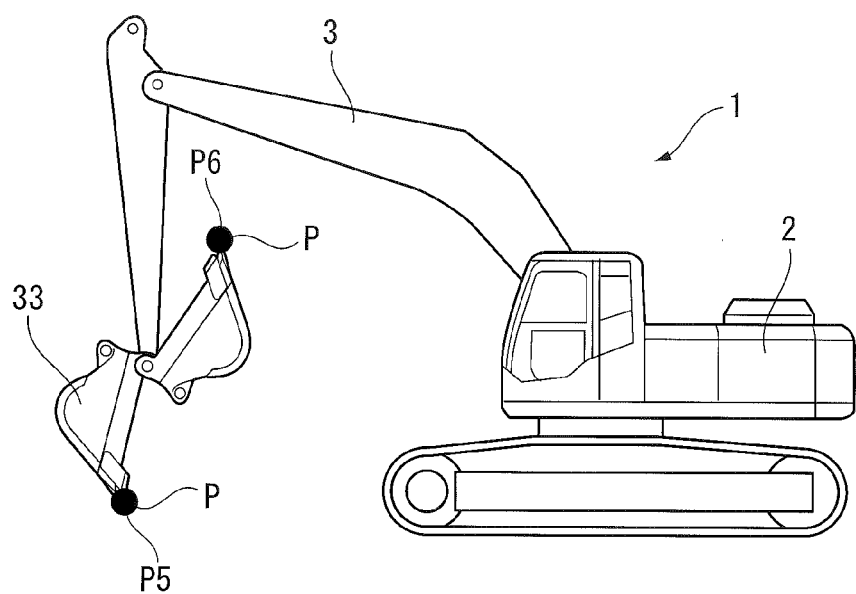
FIG. 16 is a schematic view for explaining a measurement method of a position of a blade edge of the bucket of the work machine according to the exemplary embodiment.

A value of k in the equation (9) corresponds to the measurement positions P5, P6 shown in FIG. 16. Therefore, n is equal to 2. (x4, y4) are the coordinates of the measurement position P5 in the vehicle body coordinate system. (x5, y5) are the coordinates of the measurement position P6 in the vehicle body coordinate system. A point where a function $J_2$ of the equation (9) has a minimum value is found to calculate the calibration value of the working equipment parameter(s).

The second calibration unit 89 determines whether or not $J_2$ of the equation (9) falls within a predetermined acceptable range (Step S17).

When an error is out of the acceptable range, the second calibration unit 89 determines whether or not the convergence calculation is repeated for a predetermined number of times or less (Step S18). When the convergence calculation is not repeated for the predetermined number (N) or more, the process returns to Step S16.

When the convergence calculation is repeated for the predetermined number of times (N), the first calibration unit 88 commands the display unit 71B to display information for informing the measuring person and the operator of a failure of the convergence calculation to inhibit the process from further proceeding (Step S19).

When determining that the error falls within the predetermined acceptable range, the second calibration unit 89 commands the display unit 71B to display information for informing the measuring person and the operator of a fact that the error falls within the acceptable range (Step S19).

The parameter calibration unit 87 outputs the calibrated working equipment parameter(s) to the display controller 72 so that the calibrated working equipment parameter(s) is written as a parameter for a new working equipment file in the storage 72A of the display controller 72 (Step S20).

It should be noted that an acceptable error set by the first calibration unit 88 should be smaller than an acceptable error set by the second calibration unit 89 in the exemplary embodiment. This is because that the error in the first actuation unit (the boom 31 and the arm 32), the working equipment dimension of which is large as compared with that of the bucket 33, has a larger influence on an error in the blade edge P of the bucket 33 than the second actuation unit (the bucket 33). A reduction in an error in the working equipment parameter(s) of the first actuation unit thus results in a reduction in an error in the blade edge P.

Effect(s) of Exemplary Embodiment(s)

Figure 18:
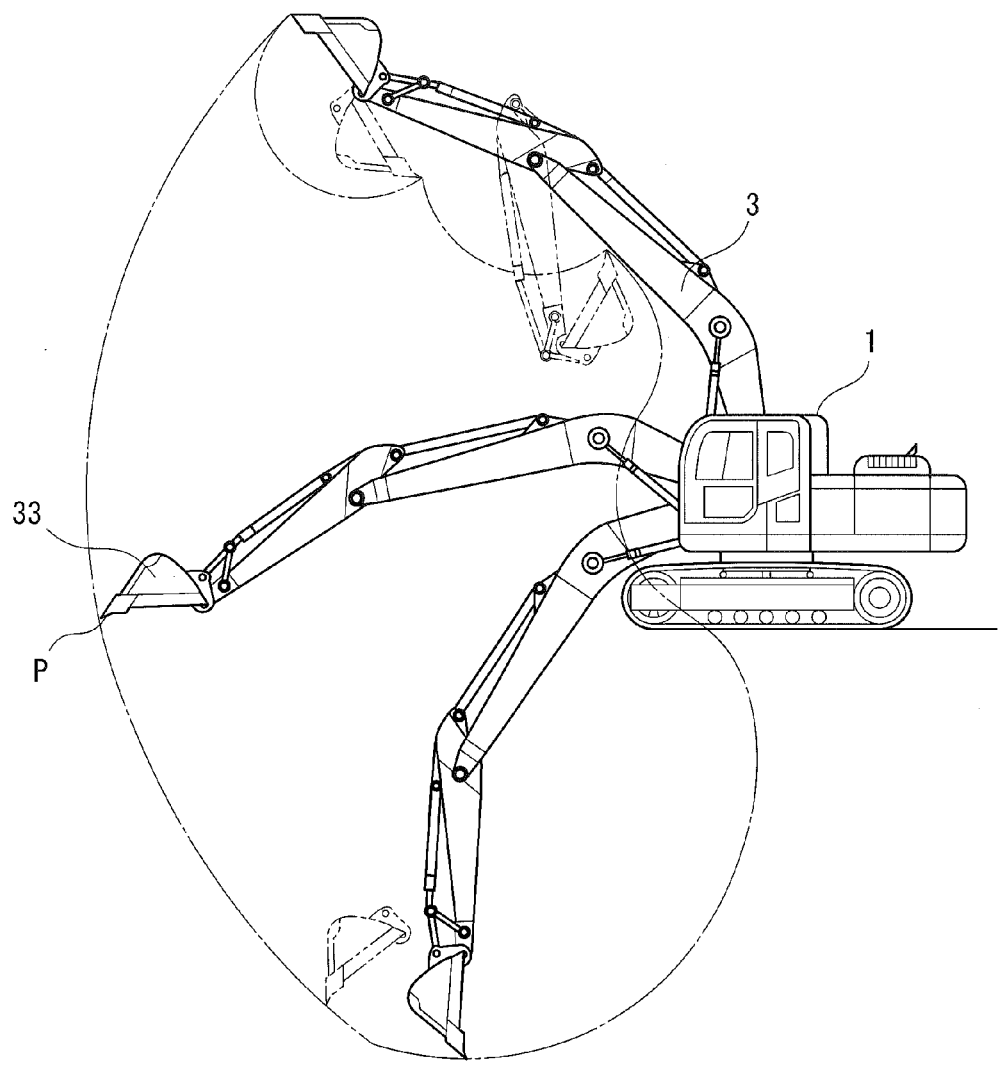
FIG. 18 is a schematic view for explaining the effects of the exemplary embodiment.

As shown in FIG. 18, the position of the blade edge P of the bucket 33 was changed within an operation range of the working equipment 3 of the hydraulic excavator 1 to check an error between the measurement value of the position of the blade edge P measured using the external measurement device 84 and the estimated value of the position of the blade edge P calculated based on the working equipment parameter(s).

When the calibration is performed in a typical method where the position of the blade edge P is measured in each of five attitudes, an error between an estimated position and a measurement position became large at a lower position of the bucket 33 and/or a distal end of the bucket 33 in the work direction.

In contrast, according to the exemplary embodiment, the first calibration unit 88 can highly accurately calibrate the working equipment parameter(s) of a member(s) of the first actuation unit based on a cylinder stroke of the member(s) of the first actuation unit with a small error. Further, based on the highly accurately calibrated working equipment parameter(s) of the member(s) of the first actuation unit, the parameter(s) of a member(s) of the second actuation unit is also highly accurately calibrated as compared with an instance where the parameter(s) is typically calibrated. This results in a reduction in an error between the measurement position of the blade edge P and a calculated estimated value of the position of the blade edge P.

An error is thus reduced over the whole operation range of the working equipment 3. Especially, when the working equipment 3 has a long length, an error is considerably reduced.

Modification(s) of Exemplary Embodiment(s)

It should be understood that the scope of the invention is not limited to the above-described exemplary embodiment(s), but includes modifications and improvements compatible with the invention.

For instance, the hydraulic excavator 1 is subjected to calibration according to the exemplary embodiment. However, the invention may be applied to any other work machine such as a wheel loader.

The external measurement device 84 may perform the measurement process according to the exemplary embodiment in a different order.

The invention claimed is:

1. A calibration device for a work machine, the work machine comprising:
a work machine body;
working equipment swingably connected to the work machine body, the working equipment comprising:
a first actuation unit swingably connected to the work machine body, the first actuation unit being configured to be actuated by a first hydraulic cylinder provided to the work machine body; and
a second actuation unit swingably connected to the first actuation unit, the second actuation unit being configured to be actuated by a second hydraulic cylinder provided to the first actuation unit;
a first swing angle detector configured to detect swing angle information of the first actuation unit relative to the work machine body;
a second swing angle detector configured to detect swing angle information of the second actuation unit relative to the first actuation unit;
an attitude calculating unit configured to calculate respective attitudes of the first actuation unit and the second actuation unit based on the detected swing angle information of the first actuation unit and the second actuation unit; and
an estimated position calculating unit configured to calculate an estimated position of a reference point of the first actuation unit based on a working equipment parameter related to a member of the first actuation unit and the attitude of the first actuation unit calculated by the attitude calculating unit and calculate an estimated position of a reference point of the second actuation unit based on a working equipment parameter related to a member of the second actuation unit and the attitude of the second actuation unit calculated by the attitude calculating unit, the calibration device being provided to the work machine to calibrate the working equipment parameters, the calibration device comprising:
a measurement value acquiring unit configured to acquire a measurement value of a reference point of the work machine body, a measurement value of the reference point of the first actuation unit and a measurement value of the reference point of the second actuation unit, the measurement values being measured using an external measurement device;

a working equipment parameter acquiring unit configured to acquire the working equipment parameter related to the member of the first actuation unit and the working equipment parameter related to the member of the second actuation unit, the working equipment parameters being used by the estimated position calculating unit;

a first calibration unit configured to calibrate the working equipment parameter related to the member of the first actuation unit based on the respective measurement values of the reference points of the work machine body and the first actuation unit measured by the measurement value acquiring unit; and a second calibration unit configured to calibrate the working equipment parameter related to the member of the second actuation unit based on the working equipment parameter related to the member of the first actuation unit calibrated by the first calibration unit and the respective measurement values of the reference points of the work machine body, the first actuation unit and the second actuation unit acquired by the measurement value acquiring unit.

2. The calibration device for the work machine according to claim 1, wherein the first swing angle detector and the second swing angle detector are respectively provided to the first hydraulic cylinder and the second hydraulic cylinder, and each comprise a stroke displacement detector that detects a stroke displacement of the first hydraulic cylinder or the second hydraulic cylinder.

3. The calibration device for the work machine according to claim 2, wherein the work machine further comprises an encoder configured to detect a swing angle of the first actuation unit relative to the work machine body, and the attitude calculating unit calibrates a reference position of the stroke displacement detector based on a reference position of the swing angle of the first actuation unit detected by the encoder.

4. The calibration device for the work machine according to claim 1, wherein the first calibration unit calibrates the working equipment parameter related to the member of the first actuation unit by repeating convergence calculation until a numerical analytic formula comprising the working equipment parameter related to the member of the first actuation unit and the measurement value of the reference point of the first actuation unit is converged within a predetermined acceptable error range, the second calibration unit calibrates the working equipment parameter related to the member of the second actuation unit by repeating convergence calculation until a numerical analytic formula comprising the working equipment parameter related to the member of the second actuation unit and the measurement value of the reference point of the second actuation unit is converged within a predetermined acceptable error range, and the acceptable error range for the second calibration unit is larger than the acceptable error range for the first calibration unit.

5. The calibration device for the work machine according to claim 1, wherein the first actuation unit comprises:

a boom swingably connected to the work machine body with a pin to be actuated by a boom cylinder provided to the work machine body; and an arm swingably connected to a distal end of the boom with a pin to be actuated by an arm cylinder provided to the boom, the second actuation unit comprises a bucket connected to a distal end of the arm with a pin, the reference point of the first actuation unit is defined by the pin at the distal end of the arm, and the reference point of the second actuation unit is defined by a distal end of the bucket in a work direction.

6. The calibration device for the work machine according to claim 5, wherein the first calibration unit calibrates the working equipment parameter related to the member of the first actuation unit based on three attitudes of the work machine, and the second calibration unit calibrates the working equipment parameter related to the member of the second actuation unit based on two attitudes of the work machine.

7. A calibration device for a work machine, the work machine comprising:

a work machine body;

working equipment swingably connected to the work machine body, the working equipment comprising:

a boom swingably connected to the work machine body, the boom being configured to be actuated by a boom cylinder provided to the work machine body;

an arm swingably connected to the boom, the arm being configured to be actuated by an arm cylinder provided to the boom; and a bucket swingably connected to the arm, the bucket being configured to be actuated by a bucket cylinder provided to the arm, a boom swing angle detector configured to detect swing angle information of the boom relative to the work machine body;

an arm swing angle detector configured to detect swing angle information of the arm relative to the boom;

a bucket swing angle detector configured to detect swing angle information of the bucket relative to the arm;

an attitude calculating unit configured to calculate attitudes of the boom, the arm and the bucket respectively based on the detected swing angle information detected by the boom swing angle detector, the arm swing angle detector and the bucket swing angle detector; and an estimated position calculating unit configured to calculate an estimated position of a blade edge of the bucket based on a working equipment parameter related to the boom, a working equipment parameter related to the arm, a working equipment parameter related to the bucket and the respective attitudes of the boom, the arm and the bucket calculated by the attitude calculating unit, the calibration device being provided to the work machine to calibrate the working equipment parameters, the calibration device comprising:

a measurement value acquiring unit configured to acquire a measurement value of a reference point of the work machine body, a measurement value of a reference point of the boom, a measurement value of a reference point of the arm and a measurement value of a reference point of the bucket, the measurement values being measured by an external measurement device;

a working equipment parameter acquiring unit configured to acquire the working equipment parameters related to the boom, the arm and the bucket, the working equipment parameters being used by the estimated position calculating unit;

a first calibration unit configured to calibrate the working equipment parameters related to the boom and the arm based on the respective measurement values of the reference points of the work machine body, the boom and the arm acquired by the measurement value acquiring unit; and a second calibration unit configured to calibrate the working equipment parameter related to the bucket based on the working equipment parameters related to the boom and the arm calibrated by the first calibration unit and the respective measurement values of the reference points of the work machine body, the boom, the arm and the bucket acquired by the measurement value acquiring unit.

8. A calibration method for a work machine, the work machine comprising:

a work machine body;

working equipment swingably connected to the work machine body, the working equipment comprising:
- a first actuation unit swingably connected to the work machine body, the first actuation unit being configured to be actuated by a first hydraulic cylinder provided to the work machine body; and
- a second actuation unit swingably connected to the first actuation unit, the second actuation unit being configured to be actuated by a second hydraulic cylinder provided to the first actuation unit;

a first swing angle detector configured to detect swing angle information of the first actuation unit relative to the work machine body;

a second swing angle detector configured to detect swing angle information of the second actuation unit relative to the first actuation unit;

an attitude calculating unit configured to calculate respective attitudes of the first actuation unit and the second actuation unit based on the detected swing angle information of the first actuation unit and the second actuation unit; and an estimated position calculating unit configured to calculate an estimated position of a reference point of the first actuation unit based on a working equipment parameter related to a member of the first actuation unit and the attitude of the first actuation unit calculated by the attitude calculating unit and calculate an estimated position of a reference point of the second actuation unit based on a working equipment parameter related to a member of the second actuation unit and the attitude of the second actuation unit calculated by the attitude calculating unit, the calibration method being performed in the work machine to calibrate the working equipment parameters, the calibration method comprising:

acquiring the working equipment parameter related to the member related to the first actuation unit and the working equipment parameter related to the member related to the second actuation unit;

acquiring a measurement value of a reference point of the work machine body, a measurement value of the reference point of the first actuation unit and a measurement value of the reference point of the second actuation unit, the measurement values being measured by an external measurement device;

calibrating the working equipment parameter related to the member of the first actuation unit based on the measurement value of the reference point of the work machine body and the measurement value of the reference point of the first actuation unit; and calibrating the working equipment parameter related to the member of the second actuation unit based on the calibrated working equipment parameter related to the member of the first actuation unit and the respective measurement values of the reference points of the work machine body, the first actuation unit and the second actuation unit.

* * * * *